United States Patent
Siclovan et al.

(12) 
(10) Patent No.: US 6,559,270 B1
(45) Date of Patent: May 6, 2003

(54) WEATHERABLE BLOCK COPOLYESTERCARBONATES AND BLENDS CONTAINING THEM, AND METHOD

(75) Inventors: Tiberiu Mircea Siclovan, Schenectady, NY (US); Jimmy Lynn Webb, Ballston Spa, NY (US); Sterling Bruce Brown, Niskayuna, NY (US); Donald Joseph Buckley, Jr., Schenectady, NY (US); James Edward Pickett, Schenectady, NY (US); Joseph Anthony Suriano, Clifton Park, NY (US); Paul Dean Sybert, Evansville, IN (US); Daniel Joseph Brunelle, Burnt Hills, NY (US); Margaret Louise Blohm, Niskayuna, NY (US); Hongyi Zhou, Niskayuna, NY (US); Georgia Dris Fishburn, Menands, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/416,529

(22) Filed: Oct. 12, 1999

Related U.S. Application Data

(63) Continuation-in-part of application No. 09/181,902, filed on Oct. 29, 1998.

(51) Int. Cl.$^7$ ............................................. C08G 64/01
(52) U.S. Cl. ....................................... 528/196; 528/198
(58) Field of Search ................................ 528/196, 198; 525/461, 462, 389, 390

(56) References Cited

U.S. PATENT DOCUMENTS

| | | |
|---|---|---|
| 3,030,331 A | 4/1962 | Goldberg |
| 3,169,121 A | 2/1965 | Goldberg |
| 3,207,814 A | 9/1965 | Goldberg |
| 3,444,129 A | 5/1969 | Young, Jr. et al. |
| 3,460,961 A | 8/1969 | Young et al. ............... 528/196 |
| 3,492,261 A | 1/1970 | Young, Jr. et al. |
| 3,503,779 A | 3/1970 | Young, Jr. et al. |
| 3,506,470 A | 4/1970 | Young, Jr. et al. |
| 3,939,117 A | 2/1976 | Ueno |
| 4,127,560 A | 11/1978 | Kramer |
| 4,156,069 A | 5/1979 | Prevorsek et al. |
| 4,194,038 A | 3/1980 | Baker et al. |
| 4,217,438 A | 8/1980 | Brunelle et al. |
| 4,238,596 A | 12/1980 | Quinn |
| 4,238,597 A | 12/1980 | Markezich et al. |
| 4,281,099 A | 7/1981 | Maresca |
| 4,286,083 A | 8/1981 | Kochanowski |
| 4,334,053 A | 6/1982 | Freitag et al. |
| 4,414,230 A | 11/1983 | Hanabata et al. |
| 4,454,275 A | 6/1984 | Rosenquist |
| 4,482,694 A | 11/1984 | Freitag et al. |
| 4,487,896 A | 12/1984 | Mark et al. |
| 4,495,325 A | 1/1985 | DeBergalis et al. |
| 4,503,121 A | 3/1985 | Robeson et al. |
| 4,506,065 A | 3/1985 | Miller et al. |
| 4,576,842 A | 3/1986 | Hartsing et al. |
| 4,617,368 A | 10/1986 | Freitag et al. |
| 4,643,937 A | 2/1987 | Dickinson et al. |
| 4,931,364 A | 6/1990 | Dickinson |
| 4,948,864 A | 8/1990 | Imai et al. |
| 4,973,652 A | 11/1990 | Ebert et al. |
| 4,992,322 A | 2/1991 | Curry et al. |
| 5,030,505 A | 7/1991 | Dickinson |
| 5,036,150 A | 7/1991 | Kawakami et al. |
| 5,064,704 A | 11/1991 | Stewart |
| 5,318,850 A | 6/1994 | Pickett et al. |
| 5,321,114 A | 6/1994 | Fontana et al. |
| 5,510,182 A | 4/1996 | Fontana et al. |
| 5,552,463 A | 9/1996 | Akkapeddi et al. |
| 5,714,567 A | 2/1998 | Idage et al. |
| 5,807,965 A | 9/1998 | Davis |
| 5,846,659 A | 12/1998 | Löwer et al. |
| 5,916,997 A | 6/1999 | Webb et al. |
| 6,087,007 A | 7/2000 | Fujii et al. |
| 6,136,441 A | 10/2000 | MacGregor et al. |
| 6,143,839 A | 11/2000 | Webb et al. |

FOREIGN PATENT DOCUMENTS

| | | |
|---|---|---|
| DE | 1 927 938 | 12/1970 |
| EP | 193176 | 9/1986 |
| EP | 448814 | 10/1991 |
| EP | 469404 | 2/1992 |
| EP | 0733 470 | 9/1996 |
| EP | 736558 | 10/1996 |
| JP | 1-199841 | 8/1989 |
| JP | 1-201326 | 8/1989 |
| JP | 6-122756 | 5/1994 |

OTHER PUBLICATIONS

James E. McGrath, et al, "Ebisphenol–A–Polysulfone Block Copolymers", Polymer Science and Engineering, vol. 17, No. 8, pp. 647–651 (1977).

SM Cohen et al, *"Transparent Ultraviolet–Barrier Coatings"*, Journal of Polymer Science: Part A–1, vol. 9, pp. 3263–3299, 1971.

William M. Eareckson, III, *"Interfacial Polycondensation. X. Polyphenyl Esters*"*, Journal of Polymer Science, vol. EL, pp. 399–406, 1959. *Presented at the Symposium on Polyethers and Condensation Polymers at the 134$^{th}$ Meeting of the American Chemical Society, Chicago, IL, Sep., 1958.

*Primary Examiner*—Terressa M. Boykin
(74) *Attorney, Agent, or Firm*—S. Bruce Brown; Noreen C. Johnson

(57) ABSTRACT

Block copolyestercarbonates may be prepared by first conducting a reaction between at least one of resorcinol or an alkyl- or haloresorcinol and at least one aromatic dicarboxylic acid dichloride, preferably isophthaloyl dichloride, terephthaloyl dichloride or a mixture thereof, to produce a hydroxy-terminated polyester intermediate, and then conducting a reaction of the intermediate with a carbonate precursor, preferably in the presence of a dihydroxy compound such as bisphenol A. The products have excellent physical properties, including a high degree of weatherability. They may be blended with other polymers such as polycarbonates, poly(alkylene carboxylates), polyarylates, polyetherimides, and addition polymers to improve the weatherability thereof.

94 Claims, No Drawings

WEATHERABLE BLOCK COPOLYESTERCARBONATES AND BLENDS CONTAINING THEM, AND METHOD

CROSS-REFERENCE TO RELATED APPLICATIONS

This application is a continuation-in-part of copending U.S. application Ser. No. 09/181,902, filed Oct. 29, 1998, which is incorporated herein by reference.

This application is related to the co-pending application of Daniel J. Brunelle et al. entitled "Thermally Stable Polymers, Methods of Preparation, and Articles Made Therefrom", Ser. No. 09/368,706, filed Aug. 5, 1999, which is assigned to the assignee of the present invention and incorporated herein by reference.

BACKGROUND OF THE INVENTION

This invention relates to resinous compositions of matter, and more specifically to block copolyestercarbonates having improved weatherability.

Polycarbonates and polyesters, especially poly(alkylene dicarboxylates), and blends thereof are widely employed classes of polymers, in part because of their excellent physical properties including high impact strength. However, their long term color instability is a problem. It causes yellowing, detracting from the transparency and attractiveness of the polymers. Loss of gloss can also be an undesirable long term phenomenon.

Yellowing of polycarbonates and polyesters is caused largely by the action of ultraviolet radiation, which is why such yellowing is frequently designated "photoyellowing". Numerous means for suppressing photoyellowing have been employed and proposed. Many of these involve incorporation in the polycarbonate of ultraviolet absorbing compounds (UVA's). For the most part, UVA's are low molecular weight compounds and they must be employed at relatively low levels, typically up to 1% by weight, to avoid degradation of the physical properties of the polymer such as impact strength and high temperature properties as reflected in heat distortion temperature.

Other polymers have been blended with polycarbonates and/or polyesters to improve their resistance to degradation by ultraviolet radiation and loss of gloss, hereinafter sometimes collectively designated "weatherability". Examples of blends of this type are weatherable blends of polycarbonates with copolyesters comprising resorcinol iso/terephthalate units, optionally in combination with "soft block" ester units derived, for example, from an aliphatic or alicyclic dihydroxy compound or dicarboxylic acid. However, such blends are typically immiscible and their use is, therefore, limited to situations in which transparency is not required. In addition, it is of interest to produce a wider variety of weatherable and weatherability-improving polymers.

Japanese Kokai 56/133,332 describes copolyestercarbonates "having a highly alternating orientation". They are prepared by a 2-step process in which the first step is preparation of a hydroxy-terminated polyester oligomer having a degree of polymerization of 1–2. The second step is treatment of said oligomer with a carbonate precursor such as phosgene to afford a final product having essentially alternating polyester and polycarbonate linkages; i.e., the degree of polymerization of the carbonate blocks is also about 1–2. These copolyestercarbonates are alleged to have excellent heat resistance, solvent resistance and moldability. No details of their weatherability are provided.

SUMMARY OF THE INVENTION

The present invention is based on the discovery of a class of block copolyestercarbonates having excellent weatherability. Blends of said copolyestercarbonates with other polymers, specifically polycarbonates and polyesters, are resistant to loss of gloss and have excellent physical properties.

One aspect of the invention, therefore, is block copolyestercarbonates comprising organic carbonate blocks alternating with arylate blocks, said arylate blocks comprising arylate structural units derived from at least one 1,3-dihydroxybenzene moiety and at least one aromatic dicarboxylic acid, and having a degree of polymerization of at least about 4.

Another aspect of the invention is block copolymers comprising moieties of the formula

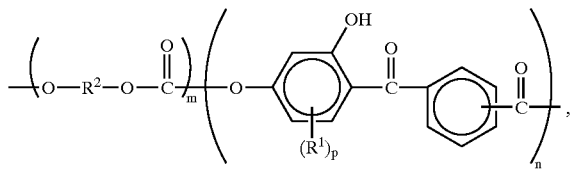

wherein each $R^1$ is independently halogen or $C_{1-4}$ alkyl, each $R^2$ is independently a divalent organic radical, p is 0–3, m is at least about 3 and n is at least about 4.

Another aspect is compositions comprising resinous blends of block copolyestercarbonates as described above with at least one other polymer selected from the group consisting of polycarbonates, poly(alkylene dicarboxylates), polyarylates, polyetherimides, and addition polymers, and any reaction products of said blends.

Still another aspect is a method for preparing block copolyestercarbonates which comprises the steps of:

(A) preparing a hydroxy-terminated polyester intermediate having a degree of polymerization of at least 4 by the reaction of at least one 1,3-dihydroxybenzene moiety with at least one aromatic dicarboxylic acid dichloride under alkaline conditions; and (B) conducting a reaction of said polyester intermediate with a carbonate precursor.

DETAILED DESCRIPTION; PREFERRED EMBODIMENTS

In one embodiment the present invention comprises block copolyestercarbonates which comprise alternating carbonate and arylate blocks. They include polymers comprising structural units of the formula (I)

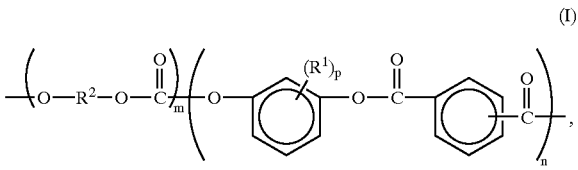

wherein each $R^1$ is independently halogen or $C_{1-12}$ alkyl, p is 0–3, each $R^2$ is independently a divalent organic radical, m is at least 1 and n is at least about 4. Preferably n is at least about 10, more preferably at least about 20 and most preferably about 30–150. Preferably m is at least about 3, more preferably at least about 10 and most preferably about 20–200. In especially preferred embodiments m is between about 20 and 50. Within the context of the invention "alternating carbonate and arylate blocks" means that the copolyestercarbonates comprise at least one carbonate block and at least one arylate block.

The arylate blocks contain structural units comprising 1,3-dihydroxybenzene moieties which may be unsubstituted or substituted. Alkyl substituents, if present, are preferably straight-chain or branched alkyl groups, and are most often located in the ortho position to both oxygen atoms although other ring locations are contemplated. Suitable $C_{1-12}$ alkyl groups include methyl, ethyl, n-propyl, isopropyl, butyl, iso-butyl, t-butyl, nonyl, decyl, and aryl-substituted alkyl, including benzyl, with methyl being particularly preferred. Suitable halogen substituents are bromo, chloro, and fluoro. 1,3-Dihydroxybenzene moieties containing a mixture of alkyl and halogen substituents are also suitable. The value for p may be 0–3, preferably 0–2, and more preferably 0–1. A preferred 1,3-dihydroxybenzene moiety is 2-methylresorcinol. The most preferred 1,3-dihydroxybenzene moiety is unsubstituted resorcinol in which p is zero. Polymers containing mixtures of 1,3-dihydroxybenzene moieties, such as a mixture of unsubstituted resorcinol with 2-methylresorcinol are also contemplated.

In the arylate structural units said 1,3-dihydroxybenzene moieties are bound to aromatic dicarboxylic acid moieties which may be monocyclic moieties, such as isophthalate or terephthalate or their chlorine-substituted derivatives; or polycyclic moieties, such as biphenyl dicarboxylate, diphenylether dicarboxylate, diphenylsulfone dicarboxylate, diphenylketone dicarboxylate, diphenylsulfide dicarboxylate, or naphthalenedicarboxylate, preferably naphthalene-2,6-dicarboxylate; or mixtures of monocyclic and/or polycyclic aromatic dicarboxylates. Preferably, the aromatic dicarboxylic acid moieties are isophthalate and/or terephthalate. Either or both of said moieties may be present. For the most part, both are present in a molar ratio of isophthalate to terephthalate in the range of about 0.25–4.0:1. When the isophthalate to terephthalate ratio is greater than about 4.0:1, then unacceptable levels of cyclic oligomer may form. When the isophthalate to terephthalate ratio is less than about 0.25:1, then unacceptable levels of insoluble polymer may form. Preferably the molar ratio of isophthalate to terephthalate is about 0.4–2.5:1, and more preferably about 0.67–1.5:1.

In the carbonate blocks, each $R^2$ is independently an organic radical derived from a dihydroxy compound. For the most part, at least about 60 percent of the total number of $R^2$ groups in the polymer are aromatic organic radicals and the balance thereof are aliphatic, alicyclic, or aromatic radicals. Suitable $R^2$ radicals include m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438, which is incorporated herein by reference.

Presently preferred dihydroxy substituted aromatic reactants are of the general formula:

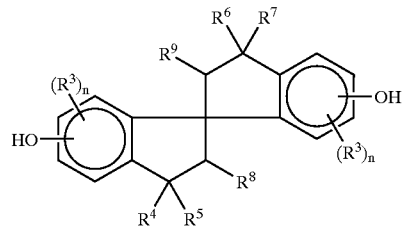

(II)

wherein $R_f$ is an alkylene, alkylidene, cycloalkylene, cycloalkylidene or arylene linkage or a mixture thereof, a linkage selected from the group consisting of ether, carbonyl, amine, a sulfur or phosphorus containing linkage, Ar and Ar' are arene radicals, Y is a substituent selected from the group consisting of of organic, inorganic and organometallic radicals, X is halogen or a monovalent hydrocarbon group selected from the class consisting of alkyl, aryl and cycloalkyl and conbinations thereof, d represents a whole number of at least 0 up to a maximum equivalent to the number of replaceable hydrogens substituted on the aromatic rings comprising Ar or Ar', e represents a whole number of from 0 to a maximum controlled by the number of replaceable hydrogens on $R_f$, a, b and c represent whole numbers including 0, when b is not zero, neither a or c may be zero, otherwise either a or c but not both may be 0, when b is zero, the aromatic groups can be joined by direct carbon bonds.

Even more preferred are dihydroxy aromatic reactants of the formulae:

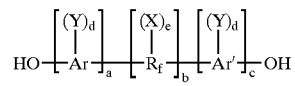

where independently each R is hydrogen, chlorine, bromine or a $C_{1-30}$ monovalent hydrocarbon or hydrocarbonoxy group, each Z is hydrogen, chlorine or bromine, subject to the proviso that at least one Z is chlorine or bromine, and

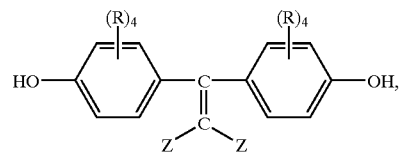

where independently each R is as defined hereinbefore, and independently $R_g$ and $R_h$ are hydrogen or a $C_{1-30}$ monovalent hydrocarbon group. Included among suitable dihydroxy-substituted aromatic hydrocarbons are the 2,2,2',2'-tetrahydro-1,1'-spirobi[1H-indene]diols having formula II:

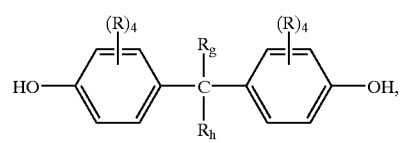

wherein each $R^3$ is independently selected from monovalent hydrocarbon radicals and halogen radicals; each $R^4$, $R^5$, $R^6$, and $R^7$ is independently $C_{1-6}$ alkyl; each $R^8$ and $R^9$ is independently H or $C_{1-6}$ alkyl; and each n is independently selected from positive integers having a value of from 0 to 3 inclusive. A preferred 2,2,2',2'-tetrahydro-1,1'-spirobi[1H-indene]-diol is 2,2,2',2'-tetrahydro-3,3,3',3'-tetramethyl-1,1'-spirobi[1H-indene]-6,6'-diol.

More preferably, each $R^2$ is an aromatic organic radical and still more preferably a radical of the formula

$$-A^1-Y-A^2-, \qquad (III)$$

wherein each $A^1$ and $A^2$ is a monocyclic divalent aryl radical and Y is a bridging radical in which one or two carbon atoms separate $A^1$ and $A^2$. The free valence bonds in formula III are usually in the meta or para positions of $A^1$ and $A^2$ in relation to Y. Compounds in which $R^2$ has formula III are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula III $A^1$ and $A^2$ typically represent unsubstituted phenylene or substituted derivatives thereof, illustrative substituents (one or more) being alkyl, alkenyl, and halogen (particularly bromine). Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, separate $A^1$ from $A^2$. The preferred embodiment is one in which one atom separates $A^1$ from $A^2$. Illustrative radicals of this type are —C=O, —O—, —S—, —SO— or —SO$_2$—, methylene, cyclohexylmethylene, 2-[2.2.1]-bicycloheptyl methylene, ethylene, isopropylidene, neopentylidene, cyclohexylidene, cyclopentadecylidene, cyclododecylidene, and adamantylidene.

Gem-alkylene radicals are often preferred. Also included, however, are unsaturated radicals. For reasons of availability and particular suitability for the purposes of this invention, the preferred bisphenol is 2,2-bis(4-hydroxyphenyl)propane (hereinafter referred to as bisphenol A or BPA), in which Y is isopropylidene and $A^1$ and $A^2$ are each p-phenylene.

Depending upon whether or not any unreacted 1,3-dihydroxybenzene moiety is present in the reaction mixture as described hereinafter, $R^2$ in the carbonate blocks may consist of or at least partially comprise a radical derived from a 1,3-dihydroxybenzene moiety. Therefore, in one embodiment of the present invention the copolyestercarbonates comprise carbonate blocks with $R^2$ radicals derived from a dihydroxy compound identical to at least one 1,3-dihydroxybenzene moiety in the polyarylate blocks. In another embodiment the copolyestercarbonates comprise carbonate blocks with $R^2$ radicals derived from a dihydroxy compound different from any 1,3-dihydroxybenzene moiety in the polyarylate blocks. In yet another embodiment the copolyestercarbonates comprise carbonate blocks containing a mixture of $R^2$ radicals derived from dihydroxy compounds at least one of which is the same as and at least one of which is different from any 1,3-dihydroxybenzene moiety in the polyarylate blocks. When a mixture of $R^2$ radicals derived from dihydroxy compounds is present, then the molar ratio of dihydroxy compounds identical to those present in the polyarylate blocks to those dihydroxy compounds different from those present in the polyarylate blocks is typically about 1:999 to 999:1. In especially preferred embodiments the copolyestercarbonates comprise carbonate blocks containing a mixture of $R^2$ radicals derived from at least two of unsubstituted resorcinol, a substituted resorcinol, and bisphenol A.

Diblock, triblock, and multiblock copolyestercarbonates are encompassed in the present invention. The chemical linkages between blocks comprising arylate chain members and blocks comprising organic carbonate chain members typically comprise a carbonate linkage between a diphenol residue of an arylate moiety and a —((C=O)—O— moiety of an organic carbonate moiety, although other types of linkages such as ester and/or anhydride are also possible. A typical carbonate linkage between said blocks is shown in Formula IV, wherein $R^1$ and p are as previously defined:

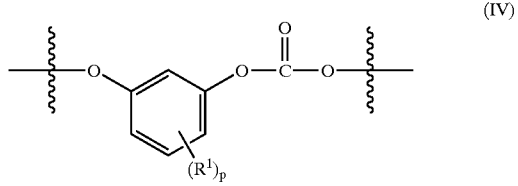

(IV)

In one embodiment the copolyestercarbonate is substantially comprised of a diblock copolymer with a carbonate linkage between an arylate block and an organic carbonate block. In another embodiment the copolyestercarbonate is substantially comprised of a triblock carbonate-ester-carbonate copolymer with carbonate linkages between the arylate block and organic carbonate end-blocks. Copolyestercarbonates with at least one carbonate linkage between an arylate block and an organic carbonate block are typically prepared from 1,3-dihydroxybenzene arylate-containing oligomers containing at least one and preferably two hydroxy-terminal sites (hereinafter sometimes referred to as hydroxy-terminated polyester intermediate).

In another embodiment the copolyestercarbonate comprises arylate blocks linked by carbonate linkages as shown in Formula V:

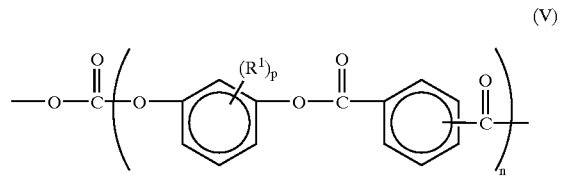

(V)

wherein $R^1$, p, and n are as previously defined, and the arylate structural units are as described for formula I. Copolyestercarbonates comprising formula V may arise from reaction of hydroxy-terminated polyester intermediate with a carbonate precursor in the substantial absence of any dihydroxy compound different from the hydroxy-terminated polyester intermediate.

In the copolyestercarbonates of the present invention the distribution of the blocks may be such as to provide a copolymer having any desired weight proportion of arylate blocks in relation to carbonate blocks. In general, copolymers containing about 10–99% by weight arylate blocks are preferred.

In step A of the method of this invention for the preparation of block copolyestercarbonates, a polyester intermediate is prepared by combining at least one 1,3-dihydroxybenzene moiety, which may be unsubstituted resorcinol (preferably) or an alkyl- and/or halo-substituted resorcinol or mixtures thereof, with at least one aromatic dicarboxylic acid dihalide, preferably isophthaloyl dichloride, terephthaloyl dichloride or a mixture thereof. The molar ratio of 1,3-dihydroxybenzene moieties to dicarboxylic acid dichlorides is preferably greater than 1:1; e.g., in the range of about 1.01–1.90:1, and more preferably in the range of about 1.01–1.25:1.

The reaction may be performed in the presence of at least one acid acceptor. Suitable acid acceptors include at least one of amines, alkali metal hydroxides, alkaline earth hydroxides, and alkaline earth oxides. Preferred reagents are tertiary amines or alkali metal hydroxides, such as potassium hydroxide or sodium hydroxide. A particularly preferred reagent is sodium hydroxide. The acid acceptor may be included in the reaction mixture in any convenient form, such as solid or liquid, and most preferably as an aqueous solution. An acid acceptor, such as an alkaline reagent, may be present in a molar ratio to dicarboxylic acid dihalides of about 2–2.5:1.

Step A of the method may further comprise combining at least one catalyst with the reaction mixture. Said catalyst may be present at a total level of 0 to 10 mole %, and preferably 0.2 to 6 mole % based on total molar amount of acid chloride groups. Suitable catalysts comprise tertiary amines, quaternary ammonium salts, quaternary phosphonium salts, hexaalkylguanidinium salts, and mixtures thereof.

Suitable tertiary amines include triethylamine, dimethylbutylamine, diisopropylethylamine, 2,2,6,6-tetramethylpiperidine, and mixtures thereof. Other contemplated tertiary amines include N-$C_1$–$C_6$-alkyl-pyrrolidines, such as N-ethylpyrrolidine, N-$C_1$–$C_6$-piperidines, such as N-ethylpiperidine, N-methylpiperidine, and N-isopropylpiperidine, N-$C_1$–$C_6$-morpholines, such as N-ethylmorpholine and N-isopropyl-morpholine, N-$C_1$–$C_6$-dihydroindoles, N-$C_1$–$C_6$-dihydroisoindoles, N-$C_1$–$C_6$-tetrahydroquinolines, N-$C_1$–$C_6$-tetrahydroisoquinolines, N-$C_1$–$C_6$-benzomorpholines, 1-azabicyclo-[3.3.0]-octane, quinuclidine, N-$C_1$–$C_6$-alkyl-2-azabicyclo-[2.2.1]-octanes, N-$C_1$–$C_6$-alkyl-2-azabicyclo-[3.3.1]-nonanes, and N-$C_1$–$C_6$-alkyl-3-azabicyclo-[3.3.1]-nonanes, N,N,N',N'-tetraalkylalkylene-diamines, including N,N,N',N'-tetraethyl-1,6-hexanediamine. Particularly preferred tertiary amines are triethylamine and N-ethylpiperidine.

When the catalyst comprises at least one tertiary amine, then said catalyst may be present at a total level of 0.1 to 10 mole %, preferably 0.2 to 6 mole %, and more preferably 0.5 to 2 mole %, based on total molar amount of acid chloride groups. In one embodiment of the invention all of the at least one tertiary amine is present at the beginning of the reaction before addition of dicarboxylic acid dichloride to 1,3-dihydroxybenzene moiety. In another embodiment a portion of any tertiary amine is present at the beginning of the reaction and a portion is added following or during addition of dicarboxylic acid dichloride to 1,3-dihydroxybenzene moiety. In this latter embodiment the amount of any tertiary amine initially present with 1,3-dihydroxybenzene moiety may range from about 0.005 wt. % to about 10 wt. %, preferably from about 0.01 to about 1 wt. %, and more preferably from about 0.02 to about 0.3 wt. % based on total amine catalyst.

Suitable quaternary ammonium salts, quaternary phosphonium salts, and hexaalkylguanidinium salts include halide salts such as tetraethylammonium bromide, tetraethylammonium chloride, tetrapropylammonium bromide, tetrapropylammonium chloride, tetrabutylammonium bromide, tetrabutylammonium chloride, methyltributylammonium chloride, benzyltributylammonium chloride, benzyltriethylammonium chloride, benzyltrimethylammonium chloride, trioctylmethylammonium chloride, cetyldimethylbenzylammonium chloride, octyltriethylammonium bromide, decyltriethylammonium bromide, lauryltriethylammonium bromide, cetyltrimethylammonium bromide, cetyltriethylammonium bromide, N-laurylpyridinium chloride, N-laurylpyridinium bromide, N-heptylpyridiniuni bromide, tricaprylylmethylammonium chloride (sometimes known as ALIQUAT 336), methyltri-$C_8$–$C_{10}$-alkyl-ammonium chloride (sometimes known as ADOGEN 464), N,N,N',N',N'-pentaalkyl-alpha, omega-amineammonium salts such as disclosed in U.S. Pat. No. 5,821,322; tetrabutylphosphonium bromide, benzyltriphenylphosphonium chloride, triethyloctadecylphosphonium bromide, tetraphenylphosphonium bromide, triphenylmethylphosphonium bromide, trioctylethylphosphonium bromide, cetyltriethylphosphonium bromide, hexaalkylguanidinium halides, hexaethylguanidinium chloride, and the like, and mixtures thereof.

An organic solvent, typically a water-immiscible solvent, is also generally present. Suitable water-immiscible solvents include dichloromethane, trichloroethylene, tetrachloroethane, chloroform, 1,2-dichloroethane, toluene, xylene, trimethylbenzene, chlorobenzene, o-dichlorobenzene, and mixtures thereof. Particularly preferred water-immiscible solvents are chlorinated aliphatic compounds such as dichloromethane. Thus, the reaction is generally conducted in a 2-phase system.

If desired, the reaction mixture may further comprise a reducing agent. Suitable reducing agents include, for example, sodium sulfite, sodium hydrosulfite, or a borohydride, such as sodium borohydride. When present, any reducing agents are typically used in quantities of from 0.25 to 2 mole %, based on moles of 1,3-dihydroxybenzene moiety. The reaction mixture may also comprise a metal chelating agent such as sodium gluconate.

The temperature of the reaction mixture may be from about 0° C. to the boiling point the solvent or mixture of solvents present. In an interfacial process which employs both water and an organic solvent essentially immiscible with water, the temperature typically ranges from ambient temperature to the boiling point of the water-organic solvent mixture under the reaction conditions. In a preferred embodiment the reaction is performed at the boiling point of the organic solvent in the water-organic solvent mixture. In an especially preferred embodiment the reaction is performed at the boiling point of dichloromethane.

Following the completion of polyester intermediate preparation, it is sometimes advantageous to acidify the aqueous phase of the two-phase system prior to phase separation. The organic phase, which contains the polyester intermediate, may then be subjected to step B which is the block copolyestercarbonate-forming reaction. Alternatively, the polyester intermediate may be recovered from solution for subsequent use in a copolymer formation step. It is also contemplated, however, to proceed to step B without acidification or separation, and this is often possible without loss of yield or purity.

Polyester intermediates from step A typically have weight average molecular weight (vs. polystyrene standards) of at least about 900, preferably at least about 2400, and more preferably at least about 4800. In especially preferred embodiments said oligomers have weight average molecular weights of about 10,000 to about 40,000, and more preferably about 15,000 to about 32,000. Said intermediates typically have about 300–1500 ppm carboxylic acid end-groups and about 2–37,000 ppm, and preferably about 2400–9700 ppm phenolic hydroxy end-groups. Carboxylic acid end-groups may be present through hydrolysis of acid chloride groups under the reaction conditions and as adventitious acid groups present in dicarboxylic acid dichloride starting material.

It is also within the scope of the invention to prepare the polyester intermediate in the absence of water entirely in an organic liquid, with the use of an acid acceptor soluble in said liquid. Suitable acid acceptors for such use include tertiary amines such as triethylamine. It is also within the scope of the invention to prepare the polyester intermediate in a substantially solvent-free process, for example a melt process or a solid-state polymerization process. It is also contemplated to conduct the first step by other ester-forming methods, as illustrated by transesterification using aromatic diesters and a 1,3-dihydroxybenzene either in a solvent or in the melt.

In step B of the method the carbonate precursor is preferably phosgene. When phosgene is employed, this step may be conducted according to art-recognized interfacial procedures (i.e., also in a two-phase system) employing a suitable interfacial polymerization catalyst and an alkaline reagent, preferably sodium hydroxide. Optionally a branching agent and/or a chain termination agent such as described below may be present. To suppress scrambling of the block copolymer, the pH is maintained at a relatively low level, typically in the range of about 4–9, for the initial part of the phosgenation reaction; it may be increased to about 10–13 during the latter part of said reaction.

Step B is preferably conducted in the presence of at least one organic dihydroxy compound different from hydroxy-terminated polyester intermediate. Said organic dihydroxy compound typically has the formula HO—$R^2$—OH, wherein $R^2$ is as previously defined. Therefore, in one embodiment the method of the present invention comprises conducting the reaction of step B in the presence of at least one organic dihydroxy compound of the formula HO—$R^2$—OH identical to at least one 1,3-dihydroxybenzene moiety in the polyarylate blocks prepared in step A. In another embodiment the method comprises conducting the reaction of step B in the presence of at least one organic dihydroxy compound of the formula HO—$R^2$—OH different from any 1,3-dihydroxybenzene moiety in the polyarylate blocks prepared in step A. In a preferred embodiment the method comprises conducting the reaction of step B in the presence of a mixture of organic dihydroxy compounds of the formula HO—$R^2$—OH at least one of which is the same as and at least one of which is different from any 1,3-dihydroxybenzene moiety in the polyarylate blocks. In a more preferred embodiment the method comprises conducting the reaction of step B in the presence of a mixture of two organic dihydroxy compounds of the formula HO—$R^2$—OH one of which is the same as and one of which is different from any 1,3-dihydroxybenzene moiety in the polyarylate blocks. When a mixture of dihydroxy compounds is present, then the molar ratio of dihydroxy compounds identical to those present in the polyarylate blocks to those dihydroxy compounds different from those present in the polyarylate blocks is typically about 1:999 to 999:1. In especially preferred embodiments the method comprises conducting the reaction of step B in the presence of a mixture of dihydroxy compounds comprising at least two of unsubstituted resorcinol, a substituted resorcinol, and bisphenol A.

The at least one organic dihydroxy compound different from hydroxy-terminated polyester intermediate may be introduced into the reaction mixture of step B through any convenient method of combination. In one embodiment said at least one organic dihydroxy compound may be present as unreacted 1,3-dihydroxybenzene moiety from step A. In another embodiment said at least one organic dihydroxy compound may be added following step A, before or during reaction with carbonate precursor in step B. In a preferred embodiment at least one organic dihydroxy compound is present as unreacted 1,3-dihydroxybenzene moiety from step A and at least one organic dihydroxy compound may be added following step A, before or during reaction with carbonate precursor in step B. Any dihydroxy compound added following step A, before or during reaction with carbonate precursor in step B, may be the same as or different from any 1,3-dihydroxybenzene moiety present initially in step A. In a particularly preferred embodiment said at least one organic dihydroxy compound comprises at least one unsubstituted resorcinol or substituted resorcinol from step A and at least one dihydroxy compound added following step A different from unsubstituted resorcinol or substituted resorcinol. In an especially preferred embodiment a molar excess of resorcinol (relative to total moles acid chloride species present) is employed in step A, in which case there may be some unreacted resorcinol remaining, and bisphenol A is added before or during reaction with carbonate precursor in step B. The amount of any 1,3-dihydroxybenzene moiety remaining unreacted from step A is less than about 15 mole %, preferably less than about 10 mole %, and more preferably less than about 5 mole % of the 1,3-dihydroxybenzene moiety initially present in step A. In an especially preferred embodiment the amount of 1,3-dihydroxybenzene moiety remaining unreacted from step A is less than about 2 mole % of the 1,3-dihydroxybenzene moiety initially present in step A.

At least one chain-stopper (also referred to sometimes hereinafter as capping agent) may also be present in either or both of steps A and B, and said chain-stopper may be incorporated into the structures of copolyestercarbonates of the invention. When any chain-stopper is employed in step A, the amount is such that a substantial portion of polyester intermediate end-groups remain as hydroxy groups for use in copolymer formation in step B through reaction with carbonate precursor. If a chain-stopper is employed in both of steps A and B, then said chain stoppers may be the same or different. One purpose of adding at least one chain-stopper is to limit the molecular weight of polymer comprising arylate polyester chain members, thus providing polymer with controlled molecular weight and favorable processability. A chain-stopper may be at least one of mono-phenolic compounds, mono-carboxylic acid chlorides, and/or mono-chloroformates. Typically, the at least one chain-stopper may be present in quantities of 0.05 to 10 mole %, based on total dihydroxy compounds in the case of mono-phenolic compounds when used in either step A and/or step B, and based on total acid dichlorides in the case mono-carboxylic acid chlorides and/or mono-chloroformates when used in step A.

Suitable mono-phenolic compounds as chain-stoppers include monocyclic phenols, such as phenol, $C_1$–$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms, preferably in which about 47 to 89% of the hydrogen atoms are part of methyl groups as described in U.S. Pat. No. 4,334,053. For some embodiments the use of a mono-phenolic UV screener as capping agent is preferred. Such compounds include 4-substituted-2-hydroxybenzophenones and their derivatives, aryl salicylates, monoesters of diphenols, such as resorcinol monobenzoate, 2-(2-hydroxyaryl)-benzotriazoles and their derivatives, 2-(2-hydroxyaryl)-1,3,5-triazines and their derivatives, and like compounds. Especially preferred mono-phenolic chain-stoppers are phenol, p-cumylphenol, and resorcinol monobenzoate.

Suitable mono-carboxylic acid chlorides as chain-stoppers include monocyclic, mono-carboxylic acid chlorides, such as benzoyl chloride, $C_1$–$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides, such as trimellitic anhydride chloride, and naphthoyl chloride; and mixtures of monocyclic and polycyclic mono-carboxylic acid chlorides. The chlorides of aliphatic monocarboxylic acids with up to 22 carbon atoms are also suitable. Functionalized chlorides of aliphatic monocarboxylic acids, such as acryloyl chloride and methacryloyl chloride, are also suitable. Suitable mono-chloroformates include monocyclic, mono-chloroformates, such as phenyl chloroformate, alkyl-substituted phenyl chloroformate, p-cumyl phenyl chloroformate, toluene chloroformate, and mixtures thereof.

A chain-stopper can be combined together with the 1,3-dihydroxybenzene moieties, can be contained in the solution of dicarboxylic acid dichlorides, or can be added to the reaction mixture after production of a precondensate. If mono-carboxylic acid chlorides and/or mono-chloroformates are used as chain-stoppers, they are preferably introduced together with dicarboxylic acid dichlorides. These chain-stoppers can also be added to the reaction mixture at a moment when the chlorides of dicarboxylic acid have already reacted substantially or to completion. If phenolic compounds are used as chain-stoppers, they can be added to the reaction mixture during the reaction in step A and/or step B.

In another embodiment the method of the invention may encompass the inclusion of at least one branching agent in step A and/or step B. Said branching agent may be incorporated into the structures of the copolyestercarbonates of the invention. Suitable branching agents include trifunctional or higher functional carboxylic acid chloride and/or trifunctional or higher functional phenol. Such branching agents, if included, can preferably be used in quantities of 0.005 to 1 mole %, based on dicarboxylic acid dichlorides or on total dihydroxy compound present, respectively. Illustrative examples of suitable branching agents include trifunctional or higher carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, and trifunctional or higher phenols, such as phloroglucinol, 4,6-dimethyl-2,4,6-tri-(4-hydroxyphenyl)-2-heptene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis-(4-hydroxyphenylisopropyl)-phenol, tetra-(4-hydroxyphenyl)-methane, 2,6-bis-(2-hydroxy-5-methylbenzyl)-4-methyl phenol, 2-(4-hydroxyphenyl)-2-(2,4-dihydroxyphenyl)-propane, tetra-(4-[4-hydroxyphenylisopropyl]-phenoxy)-methane, 1,4-bis-[(4,4-dihydroxytri-phenyl)methyl]-benzene.

Following completion of both reactions, the block copolyestercarbonate may be used in solution or transferred by any convenient procedure to some other solvent for use. For most applications the copolyestercarbonate is recovered and isolated from solution by conventional procedures. These may include, for example, at least one step of anti-solvent precipitation, washing, drying and devolatilization-pelletization via extrusion.

Block copolyestercarbonates made by the method of the present invention typically have less than about 100 ppm, preferably less than about 50 ppm, and more preferably less than about 20 ppm phenolic end-groups. Said copolymers typically contain less than about 50 ppm and preferably less than about 25 ppm free 1,3-dihydroxybenzene moiety. The copolymers typically have less than about 200 ppm, preferably less than about 100 ppm, and more preferably less than about 50 ppm carboxylic acid end-groups. The concentration of carboxylic acid end-groups in the copolyestercarbonates is typically less than that present in the polyester intermediate from step A. Carboxylic acid end-groups in said polyester intermediate may react with carbonate precursor in step B. For example, when phosgene is the carbonate precursor, carboxylic acid groups may react to form carboxylic acid chlorides which may then react with any phenolic groups present, for example phenolic end-groups on polyester intermediate and any free 1,3-dihydroxybenzene moiety added in step A.

In one of its embodiments. the present invention comprises the copolyestercarbonates as described. In the methods of making said copolyestercarbonates there may be present following step B some polyester intermediate from step A which is not covalently bound to a carbonate moiety. For example there may be present a polyester intermediate possessing end-groups which are not reactive with carbonate precursor. Illustrative examples of such end-groups may include carboxylic acid or carboxylic acid chloride or end-capped species without any functional group. Therefore, in another of its embodiments the present invention comprises the said copolyestercarbonates in combination with polyarylate homopolymer containing structural units comprising those of the polyarylate blocks in the copolyestercarbonate, said polyarylate homopolymer being made in step A of the same process as said copolyestercarbonate without isolation of said copolyestercarbonate. When it is desired to isolate substantially pure copolyestercarbonate, then the level of said polyarylate homopolymer present in copolyestercarbonate is preferably less than about 20 wt. %, more preferably less than about 10 wt. % and most preferably less than about 4 wt. % of copolyestercarbonate. In especially preferred embodiments the level of said polyarylate homopolymer is less than about 1 wt. % of copolyestercarbonate isolated substantially pure. When it is desired to prepare a blend of copolyestercarbonate with polyarylate homopolymer through synthesis in steps A and B, then proportions of the copolyestercarbonates in such blends are typically up to about 80 wt. % of the composition.

When an organic dihydroxy compound different from the 1,3-dihydroxybenzene moiety of step A is present in step B, then said dihydroxy compound may undergo transesterification with arylate blocks in both copolyestercarbonate and in any polyarylate homopolymer present, depending upon reaction parameters such as pH and temperature. Therefore, in another of its embodiments the present invention comprises the said copolyestercarbonates in combination with polyarylate copolymer with structural units comprising 1,3-dihydroxybenzene moieties from step A and organic dihydroxy compound added for step B, both in combination with aromatic dicarboxylic acid moieties as described, said polyarylate copolymer being derived from the synthesis process. The level of said polyarylate copolymer present in copolyestercarbonate is preferably less than about 20 wt. %, more preferably less than about 5 wt. % and most preferably less than about 2 wt. % of copolyestercarbonate. In especially preferred embodiments the level of said polyarylate copolymer is less than about 1 wt. % of copolyestercarbonate.

In yet another of its embodiments the present invention comprises copolyestercarbonates in which a portion of the arylate blocks have undergone transesterification with and incorporation of organic dihydroxy compound added in step B as described above. For example, in a typical embodiment copolyestercarbonates may be produced in which an organic dihydroxy compound such as bisphenol A is incorporated into a portion of the arylate blocks, either before, during, or after carbonate block formation with hydroxy-terminated polyester intermediate. The level of said organic dihydroxy compound added in step B incorporated into said arylate blocks is preferably less than about 20 wt. %, more preferably less than about 5 wt. % and most preferably less than about 2 wt. % of copolyestercarbonate. In especially preferred embodiments the level of incorporation of said organic dihydroxy compound added in step B into said arylate blocks is less than about 1 wt. % of copolyestercarbonate.

When step B is performed in the presence of at least one organic dihydroxy compound different from hydroxy-terminated polyester intermediate produced in step A, then polycarbonate homopolymer may be formed which is not covalently bound to polyester intermediate. Therefore, in another of its embodiments the present invention comprises the said copolyestercarbonates in combination with polycarbonate homopolymer containing structural units comprising those of the polycarbonate blocks in the copolyestercarbonate, said polycarbonate homopolymer being made in step B of the same process as said copolyestercarbonate without isolation of said copolyestercarbonate. When it is desired to isolate substantially pure copolyestercarbonate, then the level of said polycarbonate homopolymer present in copolyestercarbonate is preferably less than about 20 wt. %, more preferably less than about 10 wt. % and most preferably less than about 4 wt. % of copolyestercarbonate. In especially preferred embodiments the level of said polycarbonate homopolymer is less than about 2 wt. % of copolyestercarbonate isolated substantially pure. When it is desired to prepare a blend of copolyestercarbonate with at least one polycarbonate homopolymer through synthesis in steps A and B, then the at least one polycarbonate homopolymer in the blends may be prepared essentially simultaneously with carbonate block formation in the copolyestercarbonate in step B. Alternatively, said at least one polycarbonate homopolymer in the blends may be prepared after the block copolyestercarbonate formation is at least partially or essentially complete, for example, in one option, through addition of more organic dihydroxy compound, carbonate precursor, and chain stopper. The proportions of the copolyestercarbonates in such blends are determined chiefly by the resulting proportions of arylate blocks, which comprise the active weatherability-improving entities, typical proportions providing about 10–50% by weight of arylate blocks in the blend. Typically blends of copolyestercarbonate with up to about 95 wt. % polycarbonate homopolymer may be prepared through synthesis in steps A and B. In a particular embodiment blends of copolyestercarbonate comprising bisphenol A carbonate blocks may be prepared along with bisphenol A polycarbonate homopolymer through synthesis in step A and step B in the presence of phosgene.

In addition when step B is performed in the presence of at least one organic dihydroxy compound different from hydroxy-terminated polyester intermediate produced in step A, then a new polyarylate homopolymer may be formed through reaction, for example, of said organic dihydroxy compound with any aromatic dicarboxylic acid dihalide present in the reaction mixture. For example, aromatic dicarboxylic acids may be present in the reaction mixture of step A, either through hydrolysis of aromatic dicarboxylic acid dihalide or as impurities initially present in aromatic dicarboxylic acid dihalide. Said aromatic dicarboxylic acids may be converted to the corresponding dicarboxylic acid dichlorides through reaction with phosgene in step B. Therefore, in another of its embodiments the present invention comprises the said copolyestercarbonates in combination with polyarylate homopolymer containing structural units comprising organic dihydroxy compound added in step B in combination with aromatic dicarboxylic acid moieties as described, said polyarylate homopolymer being made in the same process as said copolyestercarbonate without isolation of said copolyestercarbonate. The level of said polyarylate homopolymer present in copolyestercarbonate is preferably less than about 12 wt. %, more preferably less than about 6 wt. % and most preferably less than about 4 wt. % of copolyestercarbonate. In especially preferred embodiments the level of said polyarylate homopolymer is less than about 2 wt. % of copolyestercarbonate. In an illustrative example bisphenol A polyarylate from reaction of terephthaloyl chloride and/or isophthaloyl chloride with bisphenol A added in step B may be present in the copolyestercarbonates of the invention.

The block copolyestercarbonates of this invention are polymers having excellent physical properties. Their light transmitting properties are similar to those of polycarbonates. Thus, they are substantially transparent and may be employed as substitutes for polycarbonates in the fabrication of transparent sheet material when improved weatherability is mandated.

It is believed that the weatherability and certain other beneficial properties of the copolyestercarbonates of the invention are attributable, at least in part, to the occurrence of thermally or photochemically induced Fries rearrangement of arylate blocks to yield o-hydroxybenzophenone moieties or analogs thereof which serve as stabilizers to UV radiation. More particularly, at least a portion of arylate polyester chain members can rearrange to yield chain members with at least one hydroxy group ortho to at least one ketone group. Such rearranged chain members are typically o-hydroxybenzophenone-type chain members comprising one or more of the following structural moieties:

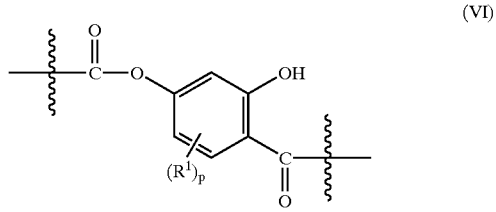

(VI)

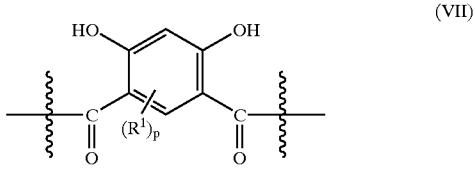

(VII)

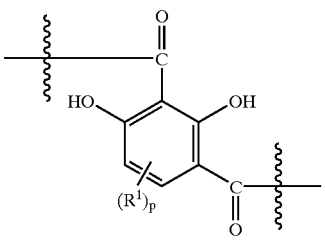

(VIII)

wherein R¹ and p are as previously defined. Thus, in one of its embodiments the present invention comprises compositions containing copolyestercarbonates containing structural units comprising those shown in Formula IX wherein R¹, R², p, m, and n are as previously defined:

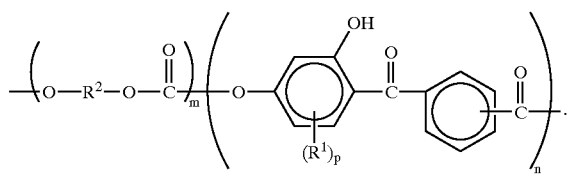

(IX)

It is also contemplated to introduce moieties of the types illustrated in Formulas VI, VII, and VIII via synthesis and polymerization of appropriate monomers in copolyestercarbonates. In one embodiment the present invention provides copolyestercarbonates comprising structural units represented by Formulas X and XI,

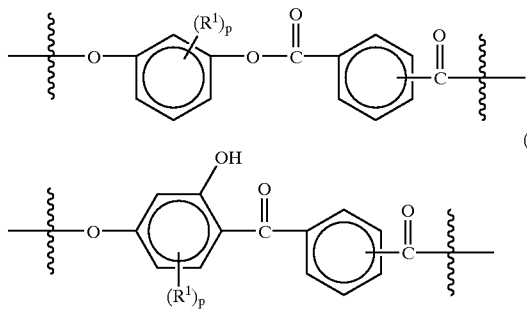

(X)

(XI)

wherein R¹ and p are as previously defined and wherein the molar ratio of structural units represented by Formula X to structural units represented by Formula XI ranges from about 99:1 to about 1:1, and preferably from about 99:1 to about 80:20. Although iso- and terephthalate units are illustrated in Formulas X and XI, the dicarboxylic acid residues in the arylate blocks may be derived from any suitable dicarboxylic acid residue, as defined hereinabove, or mixture of suitable dicarboxylic acid residues. In preferred embodiments p in both Formulas X and XI is zero and the arylate blocks comprise dicarboxylic acid residues derived from a mixture of iso- and terephthalic acid residues, wherein the molar ratio of isophthalate to terephthalate is about 0.25–4.0:1, preferably about 0.4–2.5:1, and more preferably about 0.67–1.5:1.

The block copolyestercarbonates may also be employed as weatherability-improving additives for other polymers, especially polycarbonates, polyesters, polyarylates, poly- etherimides and addition polymers. The polycarbonates in the blend compositions of the invention are, for the most part, similar in molecular structure to the carbonate blocks of the block copolyestercarbonate as described hereinabove, with bisphenol A homo- and copolycarbonates generally being preferred. Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly(trimethylene terephthalate) (hereinafter sometimes designated "PTT"), poly(ethylene naphthalate) (hereinafter sometimes designated "PEN"), poly(1,4-butylene naphthalate) (hereinafter sometimes designated "PBN"), poly(cyclohexanedimethanol terephthalate) (hereinafter sometimes designated "PCT"), poly(cyclohexanedimethanol-co-ethylene terephthalate) (hereinafter sometimes designated "PETG"), and poly(1,4-cyclohexanedimethyl-1,4-cyclohexanedicarboxylate) (hereinafter sometimes designated "PCCD"), and especially poly(alkylene arenedioates), with poly(ethylene terephthalate) and poly(1,4-butylene terephthalate) being preferred. Polyarylates include those with structural units comprising the 1,3-dihydroxybenzene moiety present in the arylate blocks of the copolyestercarbonates, those with structural units comprising any organic dihydroxy compound added in the carbonate block formation step in synthesis of said copolyestercarbonates, and those with structural units comprising both of the aforementioned dihydroxy moieties. Illustrative examples include polyarylates comprising terephthalate and/or isophthalate structural units in combination with one or more of unsubstituted resorcinol, substituted resorcinol, and bisphenol A. The polyetherimide resins useful with the present invention are generically known compounds whose preparation and properties are described in U.S. Pat. Nos. 3,803,085 and 3,905,942, each of which is incorporated herein by reference.

Suitable addition polymers include homopolymers and copolymers, especially homopolymers of alkenylaromatic compounds, such as polystyrene, including syndiotactic polystyrene, and copolymers of alkenylaromatic compounds with ethylenically unsaturated nitrites, such as acrylonitrile and methacrylonitrile; dienes, such as butadiene and isoprene; and/or acrylic monomers, such as ethyl acrylate. These latter copolymers include the ABS (acrylonitrile-butadiene-styrene) and ASA (acrylonitrile-styrene-alkyl acrylate) copolymers. Suitable addition polymers also include acrylic polymers such as those of (meth)acrylamides or of alkyl (meth)acrylates such as poly(methyl methacrylate) ("PMMA"), wherein the nomenclature "meth (acryl . . . )" indicates that both acryl and methacryl polymers are designated.

Proportions of the block copolyestercarbonates in such blends are determined chiefly by the resulting proportions of arylate blocks, which comprise the active weatherability-improving entities, typical proportions providing about 10–50% by weight of arylate blocks in the blend. By reason of some degree of incompatibility between the block copolyestercarbonates of the invention and the various polymers in which they may be incorporated, said blends are often not transparent. However, transparent blends may often be prepared by adjusting the length of the arylate blocks in the block copolyestercarbonates. The other properties of said blends are excellent.

The blend compositions of the invention may be prepared by such conventional operations as solvent blending or melt blending as by an extrusion process. They may additionally contain art-recognized additives including impact modifiers, UV screeners, flame retardants, stabilizers, ester interchange inhibitors, flow aids and mold release agents. The blends may contain fillers such as glass fibers, glass fiber fabric, chopped glass, knit glass fiber fabric, glass spheres, KEVLAR fiber, polyphenylene sulfide fiber, woven basalt fiber fabric, silicates, zeolites, titanium dioxide, stone powder, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, talc, clay, kaolin, asbestos, cellulose, wood flour, cork, cotton and synthetic textile fibers, especially reinforcing fillers such as glass fibers and carbon fibers, as well as colorants such as metal flakes, glass flakes and beads, ceramic particles, other polymer particles, dyes and pigments which may be organic, inorganic or organometallic. In addition It is intended that the blend compositions include simple physical blends and any reaction products thereof, as illustrated by polyester-polycarbonate transesterification products.

The block copolyestercarbonates of the invention, and blends thereof, may be used in various applications, especially those involving outdoor use and storage and hence requiring resistance to weathering. These applications include automotive, truck, agricultural vehicle, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coated helmets and personal protective equipment; coated synthetic or natural textiles; coated photographic film and photographic prints; coated painted articles; coated dyed articles; coated fluorescent articles; coated foam articles; and like applications. The invention further contemplates additional fabrication operations on said articles, such as, but not limited to, molding, in-mold decoration, baking in a paint oven, lamination, and/or thermoforming.

The invention is illustrated by, the following examples. All percentages and ratios are by weight unless otherwise indicated. Molecular weights were determined in chloroform by gel permeation chromatography relative to polystyrene and are reported as weight average ($M_w$) or number average ($M_n$).

EXAMPLES 1–10

These examples illustrate the preparation of hydroxyterminated resorcinol iso/terephthalate oligomers. Into a one-liter Morton flask equipped with a mechanical stirrer, pH electrode, condenser, and two addition tubes connected to metering pumps were charged resorcinol (12.11 grams [g], 0.11 moles [mol]), water (18 milliliters [ml]), dichloromethane (200 ml), and triethylamine (140 to 560 microliters, 1 to 4 mol % based on acid chlorides). The mixture was stirred at 500 rpm. A two-step addition profile was used for the delivery of acid chloride solution and base solution. In the first step, a majority of base (60 to 80% out of total base amount of 17.5 ml of 33% aqueous sodium hydroxide solution) and the whole acid chloride solution (70 ml solution of isophthaloyl dichloride (10.15 g, 0.05 mol) and terephthaloyl dichloride (10.15 g, 0.05 mol) in dichloromethane) were added at constant rates, and the remaining base was added in the second step at continuously decreasing rate. The base was pumped from graduated burettes and the amount was checked every 30 seconds in order to control the stoichiometry. The pH varied between about 3.5 and about 8. The length of the first step was varied from 7 to 13 minutes with the total step 1 and step 2 time constant at 25 minutes. The reaction mixture was further stirred for 30 minute total reaction time. The reaction conditions and weight average molecular weights of the isolated polymers are shown in Table 1.

TABLE 1

| Example | % Base Added in 1st Step | Base Addition time (min.) | mol % triethylamine | Oligomer Mw[a] |
| --- | --- | --- | --- | --- |
| 1 | 60 | 7 | 1 | 27.3 |
| 2 | 60 | 7 | 4 | 26.9 |
| 3 | 60 | 13 | 4 | 24.5 |
| 4 | 60 | 13 | 1 | 26 |
| 5 | 70 | 10 | 2.5 | 28.3 |
| 6 | 70 | 10 | 2.5 | 23 |
| 7 | 80 | 7 | 4 | 28.4 |
| 8 | 80 | 7 | 1 | 30.8 |
| 9 | 80 | 13 | 4 | 29.5 |
| 10 | 80 | 13 | 1 | 30.4 |

[a]times $10^{-3}$

EXAMPLES 11–27

The procedure of Examples 1–10 was repeated except that in some experiments 13 to 15 mol % total excess of resorcinol was used. In some experiments a small amount of capping agent (1 mole % phenol) was added. In some cases, the reaction mixture was heated externally to a refluxing point at 3 minutes. The reaction conditions and weight average molecular weights of the isolated polymers are shown in Table 2.

TABLE 2

| Example | mol % triethylamine | Comments[a] | Reflux[b] | Mw[c] |
|---|---|---|---|---|
| 11 | 4 | 1% PhOH | Y | 19.5 |
| 12 | 4 | 15% excess Rs | N | 19.9 |
| 13 | 4 | 0.5% PhOH | N | 21.6 |
| 14 | 4 | 15% excess Rs | Y | 21.8 |
| 15 | 4 | 1% PhOH | N | 21.9 |
| 16 | 4 | 1% PhOH | Y | 22.2 |
| 17 | 4 | | N | 22.3 |
| 18 | 4 | 13% excess Rs | N | 22.4 |
| 19 | 4 | 1% PhOH | Y | 22.4 |
| 20 | 4 | 1% PhOH | Y | 22.5 |
| 21 | 4 | 1% PhOH | N | 22.7 |
| 22 | 4 | 0.5 PhCOCl | N | 24.6 |
| 23 | 2.5 | 1% PhOH | Y | 24.7 |
| 24 | 4 | | N | 24.8 |
| 25 | 4 | | Y | 25.3 |
| 26 | 4 | | N | 26.6 |
| 27 | 3 | | Y | 30.3 |

[a]PhOH (phenol); Rs (resorcinol); PhCOCl (benzoyl chloride)
[b]Y (Yes); N (No)
[c]times $10^{-3}$

EXAMPLES 28–45

The procedure of Examples 1–10 was repeated except that a portion of tertiary amine was added following addition of dicarboxylic acid dichlorides to resorcinol. A total of 4 mol % tertiary amine (40000 ppm; based on moles acid dichlorides) was added. The reaction conditions and weight average molecular weights of the isolated polymers are shown in Table 3. Example 45 is a control experiment in which all the tertiary amine was present at the beginning of the reaction before addition of dicarboxylic acid dichloride to resorcinol.

TABLE 3

| Example | % Base Added in 1st Step | Base Addition time (min.) | TEA added initially (ppm) | Mw[a] |
|---|---|---|---|---|
| 28 | 80 | 7 | 50 | 29.3 |
| 29 | 80 | 7 | 10 | 23.1 |
| 30 | 80 | 7 | 10 | 22.2 |
| 31 | 80 | 7 | 50 | 29.4 |
| 32 | 96 | 7 | 10 | 32.7 |
| 33 | 96 | 7 | 50 | 34.4 |
| 34 | 88 | 10 | 30 | 26.5 |
| 35 | 88 | 10 | 30 | 25.6 |
| 36 | 80 | 13 | 50 | 25.9 |
| 37 | 80 | 13 | 10 | 25.2 |
| 38 | 96 | 13 | 50 | 29.4 |
| 39 | 96 | 13 | 10 | 22.14 |
| 40 | 96 | 13 | 50 | 26.7 |
| 41 | 96 | 13 | 10 | 23.6 |
| 42 | 96 | 16 | 10 | 21.6, 22.0 |
| 43 | 96 | 19 | 10 | 24.1, 22.3 |
| 44 | 64 | 7 | 10 | 21.46, 23.31 |
| 45 | 96 | 16 | 40000 | 24.7, 23.1 |

[a]times $10^{-3}$

EXAMPLES 46–55

These examples illustrate the preparation of resorcinol iso/terephthalate-block-copolycarbonate beginning with the preparation of hydroxy-terminated resorcinol iso/terephtalate oligomer. A number of one-liter, four-necked flasks fitted with mechanical stirrers, nitrogen inlets, reflux condensers and two pressure-equalized addition funnels were charged with 5 millimoles (mmol) of tetra-n-butylammonium bromide (TBAB) or methyltri-n-butylammonium chloride (MTBAC), various amounts of resorcinol and 150 ml of degassed dichloromethane. The flasks were then purged with nitrogen and the addition funnels were charged with 212 mmol of 15% aqueous sodium hydroxide solution, maintained at 20° C. and purged with nitrogen, and various degassed mixtures of isophthaloyl dichloride and terephthaloyl dichloride dissolved in 100 ml of dichloromethane.

The sodium hydroxide solutions were added to the flasks under nitrogen, with stirring, whereupon the resorcinol dissolved to form translucent 2-phase mixtures. The isophthaloyl/terephthaloyl dichloride mixtures were then added, with continued stirring, whereupon exotherms caused weak reflux. Stirring was continued for one hour at 35° C. The mixtures were then acidified with phosphorous acid to a pH of 3, the two phases were separated and the molecular weights of the resulting polyester intermediates were determined.

The polyester intermediate solutions were charged to phosgenation reactors fitted with stirrers, reflux condensers, phosgene inlets and pH-controlled sodium hydroxide delivery systems. There were added various proportions of bisphenol A, 2 mole percent (based on bisphenol A) of p-cumylphenol and, for each 100 mmol of bisphenol A, 0.1 ml of triethylamine and 0.5 ml of water. Phosgene, 120 mmol per 100 mmol of bisphenol A, was passed into the mixtures over 22 minutes (min), with pH control by addition of 30% aqueous sodium hydroxide solution, in the range of 8–9 until the final 5 minutes whereupon the pH was raised to 10.5–11.

The mixtures were acidified with dilute hydrochloric acid solution and the organic phases were separated and washed with water. The desired block copolyestercarbonates were precipitated by pouring into methanol and dried overnight at 60° C.

The results of the various examples are given in Table 4. Examples 51–54 represent larger scale reactions (2.2 kg per batch).

TABLE 4

| Ex. | Catalyst | Molar ratio, isophthaloyl/terephthaloyl | Polyester intermediate, $M_w$ | Polyester intermediate $M_n$ | Resorcinol, mole % excess | Product, % polyester blocks | Product Mw |
|---|---|---|---|---|---|---|---|
| 46 | TBAB | 50/50 | 19,200 | 9,500 | 5 | 35 | 73,000 |
| 47 | TBAB | 50/50 | 16,900 | 8,300 | 5 | 35 | 95,000 |
| 48 | MTBAC | 50/50 | 17,000 | 8,600 | 5 | 50 | 99,000 |
| 49 | TBAB | 50/50 | 12,500 | 6,200 | 10 | 50 | 75,200 |
| 50 | TBAB | 70/30 | 32,300 | 16,100 | 3 | 50 | 86,500 |
| 51 | MTBAC | 50/50 | 17,200 | 8,900 | 5 | 50 | 90,700 |
| 52 | MTBAC | 50/50 | 32,400 | 16,500 | 3 | 50 | 81,200 |
| 53 | MTBAC | 50/50 | 14,500 | 7,200 | 5 | 80 | 78,100 |
| 54 | MTBAC | 50/50 | 24,300 | 12,100 | 5 | 20 | 75,100 |
| 55 | MTBAC | 50/50 | 53,500 | 28,100 | 3 | 20 | 67,300 |

EXAMPLE 56

This example illustrates the preparation of a resorcinol iso/terephthalate-block-copolycarbonate beginning with the preparation of hydroxy-terminated resorcinol iso/terephthalate oligomer. To a thirty-liter glass reactor equipped with a glass impeller, centrifuge recirculation pump, reflux condenser and pressure-equilibration addition funnel were charged resorcinol (605.6 g, 5.5 mol), methyltributylammonium chloride (82.5 g of a 75% wt. aqueous solution; 0.275 mol), dichloromethane (6.5 liters), and water (2.5 liters). The recirculation pump was turned on and the mixture was degassed with nitrogen while stirring. The pH of the aqueous phase was adjusted to 7 with 50% aqueous sodium hydroxide solution. Reaction was carried out by adding a solution of acid dichlorides (507.5 g each of iso- and terephthaloyl dichlorides; 5.00 moles total in 2.0 liters of dichloromethane solution) while stirring and simultaneously adding 50% sodium hydroxide solution at such a rate that the pH was maintained between 6 and 8. The acid dichlorides were added using a three-step program with the rate of addition declining with each step. A timer was started at the beginning of acid dichloride addition. The pH was maintained at 8 while adding acid dichlorides over 8 minutes using the following protocol: 40% of total acid dichlorides was added over the first 2 minutes; 30% of total was added over the next 2 minutes; the remaining 30% of total was added over the next 4 minutes. The recirculation loop was running during the entire time.

Following complete addition of acid dichlorides, the pH was slowly raised to 11–12 over two to three minutes, and the reaction mixture was stirred for 10 minutes. The polymer formed was a hydroxy-terminated oligomer with weight average molecular weight (Mw) of approximately 20,000.

Bisphenol A (1102 g, 4.83 mol), dichloromethane (4.0 liters), triethylamine (17 ml, 0.12 mol), p-cumyl phenol capping agent (60 g), and water (6.0 liters) were then added and the recirculation loop was turned on. Phosgene was introduced at pH 7.5–8.5, then increasing slowly to pH 10–10.5 using a 15% excess over the theoretical amount of phosgene.

The reaction mixture was separated, the organic phase washed with 1N hydrochloric acid, 0.1N hydrochloric acid, and twice with water, and the polymer was isolated by precipitation in methanol. The polymer obtained was the desired resorcinol iso/terephthalate-co-BPA polycarbonate copolymer.

EXAMPLES 57–61

Samples of copolyestercarbonates were dried in vacuo at 120° C. for 15 hrs. A weighed sample of about 25–30 milligrams was placed in a circular die cavity 2 centimeters (cm.) in diameter and covered with a cylindrical piston of the same size. The die assembly containing the sample was heated in a Carver press at 290° C. for 5 minutes at 500–4,000 pounds gauge (lbs.g.) pressure, then removed and cooled in chill blocks. The heat treatment produced a film about 1 mil in thickness and 2 cm. in diameter. Molecular weights of samples before and after the heat treatment were measured by GPC using polystyrene standards. Table 5 shows examples of melt stability for resorcinol arylate-containing copolyestercarbonates prepared using the method of Example 56. Wt. % resorcinol arylate in the Table refers to wt. % resorcinol arylate chain members in the polymer, the remaining mers being organic carbonate mers.

TABLE 5

| Example | wt. % resorcinol arylate | % Mw Retention, melt processing[c] | % Mw Retention, amine test[d] |
|---|---|---|---|
| 57[a] | 50 | 89.4 | 98 |
| 58[a] | 80 | 84 | 97.9 |

TABLE 5-continued

| Example | wt. % resorcinol arylate | % Mw Retention, melt processing[c] | % Mw Retention, amine test[d] |
|---|---|---|---|
| 59[a] | 50 | 84.8 | 94 |
| 60[b] | 50 | 98.8 | 99.5 |
| 61[b] | 35 | 98.7 | 99.3 |

[a]final reaction mixture stirred 5 min at pH 10
[b]final reaction mixture stirred 20 min at pH 10–12
[c]following extrusion
[d]following treatment with diisobutylamine in solution

EXAMPLE 62

Samples (2 g) of the product of Example 51 and several other materials, described hereinafter, were dissolved in dichloromethane or chloroform (8 ml) and films with a thickness of about 250 microns were drawn on glass plates with a doctor blade. The solvents were evaporated, leaving films approximately 40 microns thick which were floated from the glass plates with water. The haze values of the films were determined using a Gardner XL-835 haze meter.

The results are given in Table 6. The following other materials were evaluated: a commercial bisphenol A polycarbonate (PC), a resorcinol polyarylate having a ratio of isophthalate to terephthalate groups of 1:1 and a molecular weight of about 50,000 (RPA), a blend of PC with the product of Example 6 and two PC-RPA blends.

TABLE 6

| Film material | Haze, % |
|---|---|
| Example 51 | 0.8 |
| PC | 0.8 |
| RPA | 0.8 |
| PC/Ex. 6, 1.5:1 | 12.7 |
| PC/RPA, 4:1 | 69.0 |
| PC/RPA, 1:1 | 38.5 |

These results show the improved compatibility of blends of the block copolyestercarbonate of Example 51 with polycarbonate, as compared with polyarylates not containing carbonate blocks.

EXAMPLES 63–67

To 1-liter, 3-necked flasks equipped with reflux condensers, mechanical stirrers and pressure equilibration addition funnels were added various amounts of resorcinol and triethylamine and 100 ml of dichloromethane. The flasks were blanketed with nitrogen and solutions of 10.151 g (50 mmol) each of isophthaloyl dichloride and terephthaloyl dichloride in 150 ml of dichloromethane were added dropwise over 4–8 minutes, so as to maintain a gentle reflux. The mixtures were further stirred at reflux temperature for 30 minutes, then transferred to separation funnels and washed once with water, twice with dilute aqueous hydrochloric acid and again with water.

The oligomer solutions were transferred to phosgenation reactors similar to those of Examples 46–55. After addition of bisphenol A, triethylamine (1 mole percent based on bisphenol A), water and p-cumylphenol as a chain termination agent, the phosgenation was conducted as described in said examples.

The results and product parameters are given in Table 7. All of the copolymers contained 50% polyarylate units.

TABLE 7

| Ex. | Resorcinol, g | Triethylamine, ml | Bisphenol A, g | CH$_2$Cl$_2$ for phosgenation, ml | Water for phosgenation, ml | Polyester intermediate, Mw | Polyester intermediate, Mn | Product Mw |
|---|---|---|---|---|---|---|---|---|
| 63 | 13.76 | 36 | 22 | 250 | 50 | 10,500 | 3,500 | 77,200 |
| 64 | 12.23 | 32 | 21.7 | 250 | 50 | 20,000 | 6,300 | 85,500 |
| 65 | 11.59 | 32 | 21.5 | 250 | 50 | 28,500 | 10,700 | 86,300 |
| 66 | 11.236 | 31 | 21.2 | 250 | 50 | 43,700 | 13,500 | 90,500 |
| 67 | 22.02 | 58 | 31 | 300 | 55 | 3,550 | 1,440 | 32,700 |

EXAMPLES 68–70

Into a 30 liter glass, reactor equipped with a glass lined impeller, reflux condenser, and recirculation loop were charged resorcinol (1355 g, 12.3 mol), triethylamine (34 ml, 2 mol %), resorcinol monobenzoate (73 g, 2.85 mol %), 9 liters of dichloromethane, and 2 liters of water. The mixture was stirred with recirculation and purged with nitrogen. A solution of isophthaloyl dichloride (1218 g, 6 mol) and terephthaloyl dichloride (1218 g, 6 mol) in 3 liters of dichloromethane was added over 8 minutes. Meanwhile, 50% aqueous sodium hydroxide was added at 150 ml/min for 8.5 minutes. The pH of the reaction varied between 6 and 8, finally reaching 7–8.5. Stirring was maintained for an additional 12 minutes with samples being removed periodically for GPC analysis. Prior to phosgene gas being added to the reaction, 2 liters of water was introduced. During phosgene addition the pH of the reaction was maintained between pH 7–8 for the first 50% of phosgene (0.2 lbs), then the pH was raised to 9.5–10.5 for the remaining 50% of phosgene (0.2 lbs). The total amount of phosgene added was typically 4 times the stoichiometric amount based on moles phenolic groups theoretically present, determined by subtracting total moles acid chloride groups added from total moles phenolic groups added. The organic phase was separated from the reaction mixture, washed with 1N hydrochloric acid, 0.1N hydrochloric acid, and three times with water. Finally the polymer was precipitated from methanol. The molecular weight of material as isolated and also following extrusion is shown in Table 8 along with similar data for Examples 69 and 70 which were prepared in the same manner as Example 68 except using different levels of resorcinol monobenzoate. Values for YI were determined on 10 mil disks prepared from extruded samples.

TABLE 8

| Example | Mw-powder | Mw-pellet | YI |
|---|---|---|---|
| 68 | 53646 | 50787 | 6.34 |
| 69 | 48655 | 45884 | 5.8 |
| 70 | 41786 | 40183 | 3.8 |

EXAMPLE 71

Various block copolyestercarbonates of Examples 63–67 were solution blended with a commercially available bisphenol A polycarbonate, and films were cast from these solutions using the procedure of Example 62. Haze measurements were made and are given in Table 9.

TABLE 9

| Copolymer ex. | Copolymer, g | PC, g | Haze, % |
|---|---|---|---|
| 63 | 0.4 | 1.6 | 4.32 |
| 63 | 0.8 | 1.2 | 5.54 |
| 63 | 1.0 | 1.0 | 22.6 |
| 63 | 1.5 | 0.5 | 14.6 |
| 63 | 2.0 | 0.0 | 0.33 |
| 64 | 2.0 | 0.0 | 0.27 |
| 65 | 2.0 | 0.0 | 0.29 |
| 66 | 2.0 | 0.0 | 0.22 |
| 67 | 0.4 | 1.6 | 0.58 |
| 67 | 0.8 | 1.2 | 1.09 |
| 67 | 1.0 | 1.0 | 1.27 |
| 67 | 1.5 | 0.5 | 2.75 |
| 67 | 2.0 | 0.0 | 0.39 |

It is apparent that the neat copolymers, as well as some of the blends using the copolyestercarbonate of Example 67, gave essentially transparent, haze-free films.

EXAMPLE 72

Blends of PC with various proportions of either RPA having a ratio of isophthalate to terephthalate groups of 1:1 or of the product of Example 51, and with various colorants (titanium dioxide at 2%, carbon black at 0.6%, black dye at 0.47%, all % by weight of the total blend) were prepared by dry blending followed by extrusion, and were injection molded into test samples. The samples were subjected to accelerated weathering tests in an Atlas Ci35a xenon arc weatherometer equipped with borosilicate inner and outer filters at an irradiance of 0.77 Watts per square meter (W/m$^2$) at 340 nanometers (nm), using cycles of 160 min light, 5 min dark and 15 min dark with water spray. The proportions of gloss retention (60° angle) after a total exposure of 935 kilojoules per square meter (kJ/m$^2$) are listed in Table 10.

TABLE 10

| Polymers | Colorant | Gloss retention, % |
|---|---|---|
| PC | Titanium dioxide | 17 |
| PC/RPA 10% | Titanium dioxide | 14 |
| PC/RPA 20% | Titanium dioxide | 30 |
| PC/Ex. 51 10% | Titanium dioxide | 36 |
| PC/Ex. 51 20% | Titanium dioxide | 37 |
| PC | Carbon black | 11 |
| PC/RPA 10% | Carbon black | 22 |
| PC/RPA 20% | Carbon black | 58 |
| PC/Ex. 51 10% | Carbon black | 40 |
| PC/Ex. 51 20% | Carbon black | 69 |
| PC | Black dye | 70 |
| PC/RPA 10% | Black dye | 55 |
| PC/RPA 20% | Black dye | 77 |
| PC/Ex. 51 10% | Black dye | 70 |
| PC/Ex. 51 20% | Black dye | 87 |

These results show the improvement in weatherability afforded by the block copolyestercarbonates of the invention in comparison with neat polycarbonate.

EXAMPLE 73

Blends of PC, 30% of a commercially available poly(1,4-butylene terephthalate) (PBT) and 0.47% of the black dye of Example 72 (all % by weight of the total blend) were dry blended, extruded and injection molded into test specimens which were evaluated in the apparatus of Example 72, alone and in combination with either RPA having a ratio of isophthalate to terephthalate groups of 1:1 or the product of Example 51. The light exposure required, in kJ/m² of energy at 340 nm, to cause 50% loss of gloss was determined for each specimen; results are given in Table 11.

TABLE 11

| PC, % | RPA, % | Ex. 51, % | Exposure, kJ/m² |
|---|---|---|---|
| 70 | — | — | 420 |
| 50 | 20 | — | 864 |
| 30 | — | 40 | 1,400 |

It is again apparent that the presence of the block copolyestercarbonate of the invention improves the weatherability of the blend to a significant extent.

EXAMPLE 74

Blends of a block copolyestercarbonate with a commercially available poly(1,4-butylene terephthalate) were prepared by melt extrusion. The PBT had IV 1.17 dl./g. (at 30° C. in 1:1 phenol/1,1,2,2-tetrachloroethane). The copolyestercarbonate had 50 wt. % carbonate block content with polyarylate blocks containing 60:40 terephthalate:isophthalate units. Glass transition temperatures (°C.) were determined using DSC at 20° C. per minute heating rate. Notched Izod impact strength was determined using ASTM D256. % Haze was measured on one-eighth inch thick bars as in Example 62. Gasoline resistance was determined using Mobil Premium unleaded gasoline and a Bergen jig as described by R. L. Bergen in SPE Journal, vol. 18 (number 6), p. 1–4 (1962). Dynamic viscosity values were determined using a Rheometrics Dynamic Spectrometer (RDS) at 250° C. Properties determined on test parts are given in Table 12.

TABLE 12

| wt. % PBT | Tg (° C.) | dynamic viscosity, poise | | notched Izod impact, ft.-lb./inch | % Haze | gasoline resistance, ε inches/inch × 100 |
|---|---|---|---|---|---|---|
| | | 1 rad/sec | 100 rad/sec | | | |
| 0 | 143 | 91809 | 45234 | 15.0 | 5.12 | 0.73 |
| 10 | 129 | 52581 | 30643 | 18.9 | 5.51 | 0.75 |
| 20 | 115 | 41376 | 25726 | 19.9 | 4.45 | 0.73 |
| 35 | 98 | 35836 | 22145 | 26.2 | 5.32 | 0.66 |
| 50 | 81 | 29256 | 19077 | 20.4 | 7.05 | 1.06 |
| 65 | 64 | 23319 | 16426 | 25.3 | 87.4 | >1.69 |
| 80 | 50 | 21732 | 15331 | — | — | >1.69 |
| 90 | 48 | 14474 | 11367 | 1.0 | — | >1.69 |
| 100 | 43 | 9466 | 7864 | 0.9 | — | >1.69 |

EXAMPLE 75

Blends of a block copolyestercarbonate with a commercially available poly(ethylene terephthalate) were prepared by melt extrusion. The PET had IV=0.78 dl/g (at 30° C. in 1:1 phenol/1,1,2,2-tetrachloroethane).The copolyestercarbonate had 50 wt. % carbonate block content, and the polyarylate blocks contained 60:40 terphthalate:isophthalate units. Glass transition temperatures, notched Izod impact values, % haze, and gasoline resistance were determined as described in Example 74. Dynamic viscosity values were determined using a Rheometrics Dynamic Spectrometer (RDS) at 275° C. Properties determined on molded test parts are given in Table 13.

TABLE 13

| wt. % PET | Tg (° C.) | dynamic viscosity, poise | | notched Izod impact, ft.-lb./inch | % Haze | gasoline resistance, ε inches/inch × 100 |
|---|---|---|---|---|---|---|
| | | 1 rad/sec | 100 rad/sec | | | |
| 0 | 139 | 26078 | 19505 | 14.6 | 6.61 | 1.09 |
| 10 | 131 | 14548 | 12097 | 17.3 | 5.71 | 0.54 |
| 20 | 122 | 11129 | 9602 | 8.8 | 5.87 | 0.5 |
| 35 | 107 | — | — | 2.0 | 7.53 | 0.7 |
| 50 | 100 | 5072 | 4145 | 1.2 | 9.77 | 0.51 |
| 65 | 92 | 5750 | 4452 | 1.0 | 10.4 | 0.5 |
| 80 | 85 | 4735 | — | 0.7 | 13.8 | 0.5 |
| 90 | 80 | 2467 | — | 0.6 | 26.1 | 0.49 |
| 100 | 77 | 1436 | 1426 | — | 18.1 | 0.49 |

EXAMPLE 76

Blends of a block copolyesterc arbonate with a commercially available poly(1,4-cyclohexanedimethanol terephthalate) were prepared by melt extrusion. The PCT had nominal inherent viscosity of 0.77 dl./g. The copolyestercarbonate had 40 wt. % carbonate block content, and the polyarylate blocks contained 50:50 terephthalate:isophthalate units. Glass transition temperatures, notched Izod impact values, % haze, and gasoline resistance were determined as described in Example 74. Dynamic viscosity values were determined using a Rheometrics Dynamic Spectrometer (RDS) at 275° C. Properties determined on molded test parts are given in Table 14.

TABLE 14

| wt. % PCT | Tg (° C.) | dynamic viscosity, poise | | notched Izod impact, ft.-lb./inch | % Haze | gasoline resistance, ε inches/inch × 100 |
|---|---|---|---|---|---|---|
| | | 1 rad/sec | 100 rad/sec | | | |
| 0 | 141 | 12746 | 10871 | 15.7 | 5.35 | 0.5 |
| 10 | 139 | 7354 | 6519 | 14.4 | 4.44 | 0.5 |
| 20 | 130 | 6130 | 5295 | 15.6 | 4.41 | 0.8 |
| 35 | 123 | 5453 | 4672 | 16.8 | 4.84 | 1.19 |
| 50 | 119 | — | — | 18.0 | 5.86 | 1.17 |
| 65 | 113 | — | — | 20.3 | 59.5 | >1.69 |
| 80 | 107 | — | — | 14.8 | 13.1 | >1.69 |
| 90 | 103 | — | — | 20.8 | 18.0 | >1.69 |
| 100 | 96 | — | — | — | — | >1.69 |

EXAMPLE 77

Blends of a block copolyestercarbonate with a commercially available poly(1,4-cyclohexanedimethyl-1,4-cyclohexanedicarboxylate) were prepared by melt extrusion. The PCCD had a melt viscosity of 2400 poise at 250° C. The copolyestercarbonate had 50 wt. % carbonate block content, and the polyarylate blocks contained 50:50 terephthalate:isophthalate units. Glass transition temperatures, notched Izod impact values, % haze, and gasoline resistance were determined as described in Example 74. Dynamic viscosity values were determined using a Rheometrics Dynamic Spectrometer (RDS) at 250° C. Properties determined on molded test parts are given in Table 15.

TABLE 15

| wt. % PCCD | Tg1 (° C.) | Tg2 (° C.) | dynamic viscosity poise 1 rad/sec | 100 rad/sec | notched Izod impact, ft.-lb./inch | % Haze | gasoline resistance, ε inches/inch × 100 |
|---|---|---|---|---|---|---|---|
| 0 | — | 143 | 70152 | 38401 | 14.4 | 2.88 | 1.13 |
| 10 | 142 | 126 | 17435 | 13663 | 13.3 | 7.98 | 0.49 |
| 20 | 141 | 119 | 18058 | 13584 | 15.4 | 7.58 | 0.48 |
| 35 | 139 | 107 | 6993 | 6203 | 18.4 | 16.0 | 0.5 |
| 50 | 139 | 98 | 4899 | 4514 | 20.2 | 71.5 | 0.86 |
| 65 | — | 87 | 3112 | 2977 | 24.6 | 85.1 | >1.69 |
| 80 | — | 77 | 1533 | 1488 | 22.0 | 25.0 | >1.69 |
| 90 | — | 73 | 1189 | 1179 | 20.3 | 14.6 | >1.69 |
| 100 | — | 66 | 2441 | 2300 | 19.7 | 16.4 | >1.69 |

EXAMPLE 78

Blends of a block copolyestercarbonate with a commercially available styrene-acrylonitrile copolymer were prepared by melt extrusion. The SAN had about 25 mole % AN content. The copolyestercarbonate had 40 wt. % carbonate block content, and the polyarylate blocks contained 50:50 terephthalate:isophthalate units. Glass transition temperatures, notched Izod impact values, and gasoline resistance were determined as described in Example 74. Dynamic viscosity values were determined using a Rheometrics Dynamic Spectrometer (RDS) at 275° C. Haze values were not determined since the blends were essentially opaque. Properties determined on molded test parts are given in Table 16.

TABLE 16

| wt. % SAN | Tg1 (° C.) | Tg2 (° C.) | dynamic viscosity, poise 1 rad/sec | 100 rad/sec | notched Izod impact, ft.-lb./inch | gasoline resistance, ε inches/inch × 100 |
|---|---|---|---|---|---|---|
| 0 | — | 141 | 12746 | 10871 | 13.1 | 0.75 |
| 10 | 114 | 141 | 15270 | 9136 | 2.5 | 0.76 |
| 20 | 112 | 138 | 15407 | 8011 | 1.4 | 0.74 |
| 35 | 111 | 136 | 9290 | 5511 | 0.9 | 0.73 |
| 50 | 109 | 136 | 2980 | 2582 | 0.6 | 0.75 |
| 65 | 110 | 137 | 1695 | 1443 | 0.2 | 0.76 |
| 80 | 109 | 136 | 1167 | 1024 | 0.2 | 0.74 |
| 90 | 109 | — | 927 | 839 | 0.2 | 0.73 |
| 100 | 109 | — | 754 | 702 | 0.2 | 0.72 |

EXAMPLE 79

Blends of a block copolyestercarbonate with a commercially available poly(methylmethacrylate) were prepared by melt extrusion. The PMMA a melt viscosity of 2300 poise at 275° C. The copolyestercarbonate had 50 wt. % carbonate block content, and the polyarylate blocks contained 50:50 terephthalate:isophthalate units. Glass transition temperatures, notched Izod impact values, and gasoline resistance were determined as described in Example 74. Dynamic viscosity values were determined using a Rheometrics Dynamic Spectrometer (RDS) at 275° C. Haze values were not determined since the blends were essentially opaque. Properties determined on molded test parts are given in Table 17.

TABLE 17

| wt. % PMMA | Tg1 (° C.) | Tg2 (° C.) | dynamic viscosity, poise 1 rad/sec | 100 rad/sec | notched Izod impact, ft.-lb./inch | gasoline resistance, ε inches/inch × 100 |
|---|---|---|---|---|---|---|
| 0 | — | 143 | 21805 | 16899 | 14.4 | 1.13 |
| 10 | 108 | 142 | 26441 | 14893 | 2.8 | 1.17 |
| 20 | 108 | 141 | 24570 | 12084 | 1.0 | 1.13 |
| 35 | 108 | 142 | 13792 | 8586 | 1.1 | 1.06 |
| 50 | 108 | 143 | 7464 | 5480 | 0.8 | 0.94 |
| 65 | 108 | 141 | 3983 | 3243 | 0.3 | 0.66 |
| 80 | 108 | 142 | 2174 | 2586 | 0.3 | — |
| 90 | 107 | 142 | 2700 | 2191 | 0.3 | — |
| 100 | 107 | — | 2272 | 1832 | 0.2 | — |

EXAMPLE 80

Blends of a block copolyestercarbonate with a commercially available poly(BPA-carbonate)-co-poly(dimethylsiloxane) were prepared by melt extrusion. The copolymer contained about 20 wt. % dimethylsiloxane block units. The copolyestercarbonate had 50 wt. % carbonate block content, and the polyarylate blocks contained 50:50 terephthalate:isophthalate units. Glass transition temperatures, notched Izod impact values, and gasoline resistance were determined as described in Example 74. Dynamic viscosity values were determined using a Rheometrics Dynamic Spectrometer (RDS) at 275° C. Haze values were not determined since the blends were essentially opaque. Properties determined on molded test parts are given in Table 18.

TABLE 18

| wt. % PC-co-PDMS | Tg (° C.) | dynamic viscosity, poise 1 rad/sec | 100 rad/sec | notched Izod impact, ft.-lb./inch | gasoline resistance, ε inches/inch × 100 |
|---|---|---|---|---|---|
| 0 | 142 | 21805 | 16899 | 14.4 | 1.13 |
| 10 | 143 | 22559 | 14878 | 14.5 | 1.09 |
| 20 | 144 | 27721 | 14949 | 13.3 | 1.25 |
| 35 | 143 | 34989 | 14385 | 13.3 | — |
| 50 | 145 | 41927 | 13794 | 17.6 | — |
| 65 | 144 | 41928 | 11544 | 14.3 | — |
| 80 | 145 | 46669 | 10854 | 12.1 | — |
| 90 | 145 | 48947 | 10425 | 8.5 | — |
| 100 | 145 | 61373 | 12353 | 6.0 | — |

While typical embodiments have been set forth for the purpose of illustration, the foregoing descriptions should not be deemed to be a limitation on the scope of the invention.

Accordingly, various modifications, adaptations, and alternatives may occur to one skilled in the art without departing from the spirit and scope of the present invention.

What is claimed is:

1. A block copolyestercarbonate comprising organic carbonate blocks alternating with arylate blocks, said arylate blocks comprising arylate structural units derived from at least one 1,3-dihydroxybenzene moiety and at least one aromatic dicarboxylic acid and having a degree of polymerization of at least about 4.

2. The block copolyestercarbonate according to claim 1 wherein the carbonate blocks are selected from the group consisting of bisphenol A carbonate blocks, unsubstituted resorcinol carbonate blocks, and mixtures thereof.

3. The block copolyestercarbonate according to claim 1 wherein the degree of polymerization of the carbonate blocks is at least about 3.

4. The block copolyestercarbonate according to claim 1 comprising arylate structural units derived from at least one of unsubstituted resorcinol or a substituted resorcinol, in combination with isophthalate or terephthalate or thier chlorine-substituted derivatives, or a mixture thereof.

5. The block copolyestercarbonate according to claim 4 wherein the arylate structural units are derived from a mixture of isophthalate and terephthalate.

6. The block copolyestercarbonate according to claim 5 wherein the molar ratio of isophthalate to terephthalate in the arylate structural units is in the range of about 0.25–4.0:1.

7. The block copolyestercarbonate according to claim 5 wherein the degree of polymerization of the arylate blocks is at least about 10.

8. The block copolyestercarbonate according to claim 5 which comprises about 10–99% by weight arylate blocks.

9. A block copolyestercarbonate comprising organic carbonate blocks alternating with arylate blocks, said carbonate blocks having a degree of polymerization of at least about 3 and comprising structural units derived from bisphenol A, and said arylate blocks having a degree of polymerization of at least about 4 and comprising structural units derived from unsubstituted resorcinol and a mixture of isophthalate and terephthalate residues in a ratio of about 0.25–4.0:1 isophthalate to terephthalate.

10. A block copolyestercarbonate comprising moieties of the formula

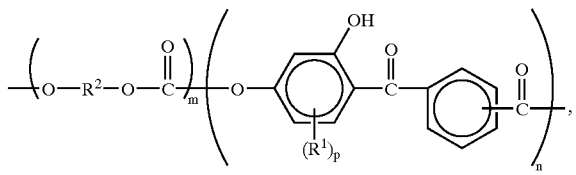

wherein each $R^1$ is independently halogen or $C_{1-4}$ alkyl, each $R^2$ is independently a divalent organic radical, p is 0–3, m is at least about 3 and n is at least about 4.

11. The block copolyestercarbonate according to claim 10 wherein p is zero; $R^2$ is 2,2-bis(4-phenylene)propane, or m-phenylene, or a mixture thereof; n is at least about 10 and m is at least about 20, said copolyestercarbonate comprising isophthalate and terephthalate ester structural units in a molar ratio in the range of about 0.25–4.0:1 isophthalate to terephthalate.

12. The block copolymer obtained by Fries rearrangement of a block copolyestercarbonate according to claim 1.

13. The block copolymer according to claim 12 wherein the carbonate blocks are selected from the group consisting of bisphenol A carbonate blocks, unsubstituted resorcinol carbonate blocks, and mixtures thereof.

14. The block copolymer according to claim 12 wherein the degree of polymerization of the carbonate blocks is at least about 10.

15. The block copolyestercarbonate according to claim 12 wherein the arylate blocks comprise isophthalate residues or terephthalate residues or a mixture thereof.

16. The block copolyestercarbonate according to claim 15 wherein the arylate blocks consist of a mixture of isophthalate and terephthalate residues.

17. The block copolyestercarbonate according to claim 16 wherein the molar ratio of isophthalate to terephthalate in the arylate blocks is in the range of about 0.25–4.0:1.

18. A composition comprising a resinous blend of a block copolyestercarbonate according to claim 1 with at least one other polymer selected from the group consisting of polycarbonates, poly(alkylene dicarboxylates), polyarylates, polyetherimides, and addition polymers, and any reaction products thereof.

19. The composition according to claim 18 wherein the other polymer is a polycarbonate.

20. The composition according to claim 19 wherein the polycarbonate contains structural units comprising those of the polycarbonate blocks in the copolyestercarbonate.

21. The composition according to claim 19 wherein the other polymer is a bisphenol A polycarbonate.

22. The composition according to claim 18 wherein the other polymer is a poly(alkylene dicarboxylate).

23. The composition according to claim 22 wherein the other polymer is at least one member selected from the group consisting of poly(1,4-butylene terephthalate), poly(ethylene terephthalate), poly(1,4-butylene naphthalate), poly(ethylene naphthalate), poly(trimethylene terephthalate), poly(cyclohexanedimethanol terephthalate), poly(cyclohexanedimethanol-co-ethylene terephthalate), and poly(1,4-cyclohexanedimethyl-1,4-cyclohexanedicarboxylate).

24. The composition according to claim 23 wherein the other polymer is poly(ethylene terephthalate).

25. The composition according to claim 18 wherein the other polymer is a polyarylate.

26. The composition according to claim 25 wherein the polyarylate contains structural units comprising those of the polyarylate blocks in the copolyestercarbonate.

27. The composition according to claim 25 wherein the polyarylate contains structural units comprising those of the polycarbonate blocks in the copolyestercarbonate.

28. A composition comprising a resinous blend of a bisphenol A polycarbonate and a block copolyestercarbonate comprising organic carbonate blocks alternating with arylate blocks, said carbonate blocks having a degree of polymerization of at least about 3 and comprising structural units derived from bisphenol A, and said arylate blocks having a degree of polymerization of at least about 4 and comprising structural units derived from unsubstituted resorcinol and a mixture of isophthalate and terephthalate residues in a ratio of about 0.25–4.0:1 isophthalate to terephthalate.

29. An article made from the composition of claim 18.

30. The article according to claim 29 which is an automotive, truck, military vehicle, agricultural vehicle, or motorcycle exterior or interior component, panel, quarter panel, rocker panel, trim, fender, door, decklid, trunklid, hood, bonnet, roof, bumper, fascia, grill, mirror housing, pillar applique, cladding, body side molding, wheel cover, hubcap, door handle, spoiler, window frame, headlamp bezel, headlamp, tail lamp, tail lamp housing, tail lamp bezel, license plate enclosure, roof rack, or running board; an enclosure, housing, panel, part, or trim for an outdoor vehicle or device, an electrical or telecommunication device, network interface device, outdoor furniture, aircraft, boat or marine equipment, outboard motor, depth finder, personal water-craft, jet-ski, pool, spa, hot-tub, step, or step covering, an automatic teller machine (ATM), a lawn or garden tractor, lawn mower, tool, sporting equipment or toy, snowmobile, recreational vehicle, golf course marker, or playground equipment; an enclosure, housing, panel, part, or trim for a computer, desk-top computer, portable computer, lap-top computer, palm-held computer, monitor, printer, keyboard, FAX machine, copier, telephone, mobile phone, radio sender, radio receiver, meter, antenna, light fixture, lighting appliance, transformer, air conditioner; an article used in building or construction, glazing, roofing, window, window trim, floor, wall panel, door, door trim, decorative window furnishing or treatment; a treated glass cover for a picture, painting, poster, or display item; a protected graphic; an outdoor or indoor sign; an article made from a plastic-wood combination; a utility pit cover; cladding or seating for public transportation; cladding or seating for trains, subways, or buses; cladding for satellite dishes; coated helmet or personal protective equipment; coated synthetic or natural textiles; coated photographic film or photographic print; coated painted article; coated dyed article; coated fluorescent article; or coated foam article.

31. A method for preparing a block copolyestercarbonate which comprises the steps of:
  (A) preparing a hydroxy-terminated polyester intermediate having a degree of polymerization of at least 4 by the reaction of at least one 1,3-dihydroxybenzene moiety with at least one aromatic dicarboxylic acid dichloride in the presence of an acid acceptor; and
  (B) conducting a reaction of said polyester intermediate with a carbonate precursor.

32. The method according to claim 31 wherein the copolyestercarbonate is recovered from the reaction mixture.

33. The method according to claim 31 wherein the molar ratio of the at least one 1,3-dihydroxybenzene moiety to dicarboxylic acid dichlorides in step A is in the range of about 1.01–1.90:1.

34. The method according to claim 31 wherein the molar ratio of the at least one 1,3-dihydroxybenzene moiety to dicarboxylic acid dichlorides in step A is in the range of about 1.01–1.25:1.

35. The method according to claim 31 wherein the 1,3-dihydroxybenzene moiety in step A is at least one of unsubstituted resorcinol or a substituted resorcinol, and the dicarboxylic acid dichloride is isophthaloyl dichloride, terephthaloyl dichloride or thier chlorine-substituted derivatives, or a mixture thereof.

36. The method according to claim 35 wherein the 1,3-dihydroxybenzene moiety is unsubstituted resorcinol, and the dicarboxylic acid dichloride is a mixture of isophthaloyl dichloride and terephthaloyl dichloride.

37. The method according to claim 36 wherein the molar ratio of isophthaloyl dichloride to terephthaloyl dichloride is in the range of about 0.25–4.0:1.

38. The method according to claim 31 wherein the reaction in step B is conducted in the presence of at least one organic dihydroxy compound different from the hydroxy-terminated polyester intermediate.

39. The method according to claim 38 wherein the at least one organic dihydroxy compound is the same as at least one 1,3-dihydroxybenzene moiety in step A.

40. The method according to claim 39 wherein the at least one organic dihydroxy compound is unsubstituted resorcinol.

41. The method according to claim 38 wherein the at least one organic dihydroxy compound is different from any 1,3-dihydroxybenzene moiety in step A.

42. The method according to claim 41 wherein the at least one organic dihydroxy compound is bisphenol A.

43. The method according to claim 41 wherein at least one polycarbonate homopolymer is prepared in the presence of or simultaneously with the copolyestercarbonate.

44. The method according to claim 43 wherein the at least one organic dihydroxy compound is bisphenol A.

45. The method according to claim 38 wherein the reaction in step B is conducted in the presence of a mixture of organic dihydroxy compounds, at least one of which is the same as and at least one of which is different from any 1,3-dihydroxybenzene moiety in step A.

46. The method according to claim 45 wherein the mixture of organic dihydroxy compounds consists of unsubstituted resorcinol and bisphenol A.

47. The method according to claim 31 wherein the carbonate precursor is phosgene.

48. The method according to claim 31 wherein steps A and B are both conducted in a two-phase system including an aqueous phase and a water-immiscible organic solvent.

49. The method according to claim 31 wherein the pH in step B is maintained in the range of about 4–9 for the initial part and increased to about 10–13 during the latter part of said reaction.

50. A method for preparing a block copolyestercarbonate which comprises the steps of:
  (A) preparing a hydroxy-terminated polyester intermediate having a degree of polymerization of at least 4 by the reaction of unsubstituted resorcinol with a mixture of isophthaloyl dichloride and terephthaloyl dichloride in a ratio of about 0.25–4.0:1 isophthaloyl to terephthaloyl; and
  (B) conducting a reaction of said, polyester intermediate with phosgene in the presence of bisphenol A in a two-phase system including an aqueous phase and dichloromethane.

51. A copolyestercarbonate made according to the method of claim 31.

52. A copolyestercarbonate made according to the method of claim 42.

53. A copolyestercarbonate made according to the method of claim 46.

54. A blend of copolyestercarbonate and polycarbonate homopolymer made according to the method of claim 44.

55. The block copolyestercarbonate according to claim 1 wherein the carbonate blocks comprise structural units derived from a 1,3-dihydroxybenzene moiety.

56. The block copolyestercarbonate according to claim 1 wherein the carbonate blocks comprise structural units derived from a dihydroxy compound identical to at least one 1,3-dihydroxybenzene moiety in the polyarylate blocks.

57. The block copolyestercarbonate according to claim 1 wherein the carbonate blocks comprise structural units derived from a dihydroxy compound different from any 1,3-dihydroxybenzene moiety in the polyarylate blocks.

58. The block copolyestercarbonate according to claim 1 wherein the carbonate blocks comprise structural units derived from dihydroxy compounds at least one of which is the same as and at least one of which is different from any 1,3-dihydroxybenzene moiety in the polyarylate blocks.

59. The block copolyestercarbonate according to claim 1 wherein the carbonate blocks comprise structural units derived from at least two of unsubstituted resorcinol, a substituted resorcinol, and bisphenol A.

60. The block copolyestercarbonate according to claim 1 wherein the carbonate blocks comprise structural units derived from dihydroxy substituted aromatic reactants of the formula:

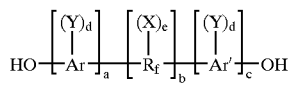

wherein $R_f$ is an alkylene, alkylidene, cycloalkylene, cycloalkylidene or arylene linkage or a mixture thereof, or a linkage selected from the group consisting of ether, carbonyl, amine, a sulfer or phosphorus containing linkage; Ar and Ar' are arene radicals; Y is a substituent selected from the group consisting of organic, inorganic and organometallic radicals; X is halogen or a monovalent hydrocarbon group selected from the group consisting of alkyl, aryl and cycloalkyl and combinations thereof; d represents a whole number of at least 0 up to a maximum equivalent to the number of replaceable hydrogens substituted on the aromatic rings comprising Ar or Ar'; e represents a whole number of from 0 to a maximum controlled by the number of replaceable hydrogens on $R_f$; a, b and c represent whole numbers including 0; when b is not zero, the aromatic groups can be joined by direct carbon bonds.

61. The block copolyestercarbonate according to claim 1 wherein the carbonate blocks comprise structural units derived from dihydroxy aromatic reactants of the formula:

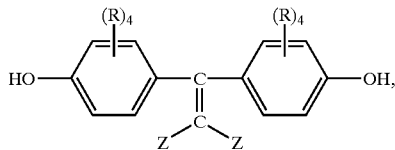

where independently each R is hydrogen, chlorine, bromine or a $C_{1-30}$ monovalent hydrocarbon or hydrocarbonoxy group, each Z is hydrogen, chlorine or bromine, subject to the proviso that at least one Z is chlorine or bromine.

62. The block copolyestercarbonate according to claim 1 wherein the carbonate blocks comprise structural units derived from dihydroxy aromatic reactants of the formula:

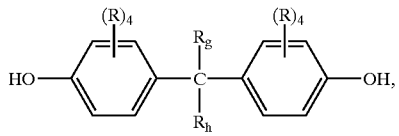

where independently each R is as defined hereinafter, and independently $R_g$ and $R_h$ and hydrogen or a $C_{1-30}$ monovalent hydrocarbon group.

63. The block copolyestercarbonate according to claim 1 which is substantially comprised of a triblock carbonate-arylate-carbonate copolymer.

64. The block copolyestercarbonate according to claim 63 with carbonate linkages between arylate block and carbonate blocks.

65. The block copolyestercarbonate according to claim 9 which is substantially comprised of a triblock carbonate-arylate-carbonate copolymer.

66. The block copolyestercarbonate according to claim 65 with carbonate linkages between arylate block and carbonate blocks.

67. The block copolyestercarbonate according to claim 1 further comprising a chain termination agent.

68. The block copolyestercarbonate according to claim 67 wherein the chain termination agent is at least one of mono-phenolic compounds, mono-carboxylic acid cholrides, or mono-chloroformates.

69. The block copolyestercarbonate according to claim 68 wherein the chain termination agent is at least one of phenol, p-cumylphenol, or resorcinol monobenzoate.

70. The block copolyestercarbonate according to claim 4 further comprising a chain termination agent.

71. The block copolyestercarbonate according to claim 9 further comprising a chain termination agent.

72. The block copolyestercarbonate according to claim 71 wherein the chain termination agent is at least one of phenol, p-cumylphenol, or resorcinol monobenzoate.

73. A block copolyestercarbonate comprising structural units represented by Formulas (X), (XI) and (XII),

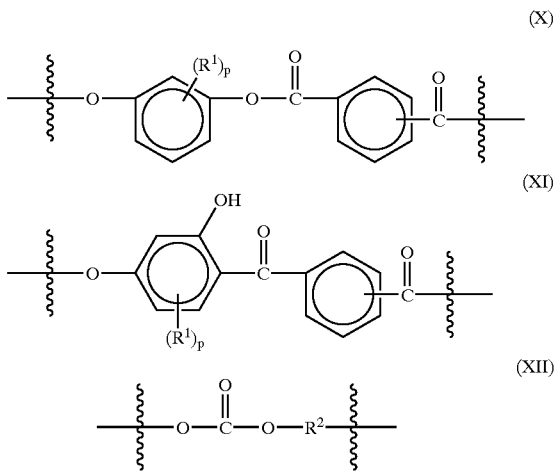

wherein each $R^1$ is independently halogen or $C_{1-4}$ alkyl, each $R^2$ is independently a divalent organic radical, and p is 0–3, and wherein the molar ratio of structural units represented by Formula X to structural units represented by Formula XI ranges from about 99:1 to about 1:1.

74. The block copolyestercarbonate according to claim 73 wherein p is zero; $R^2$ is 2,2-bis(4-phenylene, or m-phenylene, or a mixture thereof; said copolyestercarbonate comprising isophthalate and terephthalate ester structural units in a molar ratio in the range of about 0.24–4.0:1 isophthalate to terephthalate.

75. The block copolyestercarbonate according to claim 73 wherein the carbonate blocks comprise structural units derived from a 1,3-dihydroxybenzene moiety.

76. The block copolyestercarbonate according to claim 73 wherein the carbonate blocks comprise structural units derived from a dihydroxy compound identical to at least one 1,3-dihydroxybenzene moiety in the polyarylate blocks.

77. The block copolyestercarbonate according to claim 73 wherein the carbonate blocks comprise structural units derived from a dihydroxy compound different from any 1,3-dihydroxybenzene moiety in the polyarylate blocks.

78. The block copolyestercarbonate according to claim 73 wherein the carbonate blocks comprise structural units derived from dihydroxy compounds at least one of which is the same as and at least one of which is different from any 1,3-dihydroxybenzene moiety in the polyarylate blocks.

79. The block copolyestercarbonate according to claim 73 wherein the carbonate blocks comprise structural units derived from at least two of unsubstituted resorcinol, a substituted resorcinol, and bisphenol A.

80. The block copolyestercarbonate according to claim 73 wherein the carbonate blocks comprise structural units derived from dihydroxy substituted aromatic reactants of the formula:

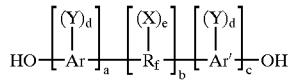

wherein $R_f$ is an alkylene, alkylidene, cycloalkylene, cycloalkylidene or arylene linkage or a mixture thereof, or a linkage selected from the group consisting of ether, carbonyl, amine, a sulfer or phosphorus containing linkage; Ar and Ar' are arene radicals; Y is a substituent selected from the group consisting of organic, inorganic and organometallic radicals; X is halogen or a monovalent hydrocarbon group selected from the group consisting of alkyl, aryl and cycloalkyl and combinations thereof; d represents a whole number of at least 0 up to a maximum equivalent to the number of replaceable hydrogens substituted on the aromatic rings comprising Ar or Ar'; e represent a whole number of from 0 to a maximum controlled by the number of replaceable hydrogens on $R_f$; a, b and c represent whole numbers including 0; when b is not zero; neither a or c may be zero, otherwise either a or c but not both may be 0; and when b is zero, the aromatic groups can be joined by direct carbon bonds.

81. The block copolyestercarbonate according to claim 73 wherein the carbonate blocks comprise structural units derived from dihydroxy aromatic reactants of the formula:

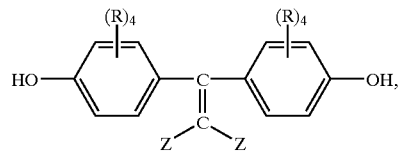

wherein independently each R is hydrogen, chlorine, bromine or a $C_{1-30}$ monovalent hydrocarbon or hydrocarbonoxy group, each Z is hydrogen, chlorine or bromine, subject to the proviso that at least one Z is chlorine or bromine.

82. The block copolyestercarbonate according to claim 73 wherein the carbonate blocks comprise structural units derived from dihydroxy aromatic reactants of the formula:

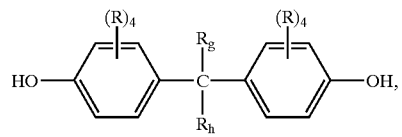

where independently each R is as defined hereinbefore, and independently $R_g$ and $R_h$ are hydrogen or a $C_{1-30}$ monovalent hydrocarbon group.

83. An article made from the composition of claim 1.

84. The article according to claim 83 which is an automotive, truck, military vehicle, agricultural vehicle, or motorcycle exterior or interior component, panel, quarter panel, rocker panel, trim, fender, door, decklid, hood, bonnet, roof, bumper, fascia, grill, mirror housing, pillar applique, cladding, body size molding, wheel cover, hubcap, door handle, spoiler, window frame, headlamp benzel, headlamp, tail lamp, tail lamp housing, tail lamp bezel, license plate enclosure, roof rack, or running board; an enclosure, housing, panel, part, or trim for an outdoor vehicle or device, an electrical or telecommunication device, network interface device, outdoor furniture, aircraft, boat or marine equipment, outboard motor, depth finder, personal water-craft, jet-ski, pool, spa, hot-tub, step, or step covering, an automatic teller machine (ATM), a lawn or garden tractor, lawn mower, tool, sporting equipment or toy, snowmobile, recreational vehicle, golf course marker, or playground equpiment; an enclosure, housing, panel, part, or trim for a computer, desk-top computer, portable computer, lap-top computer, palm-held computer, monitor, printer, keyboard, FAX machine, copier, telephone, mobile phone, radio sender, radio receiver, meter, antenna, light fixture, lighting appliance, transformer, air conditioner; an article used in building or construction, glazing, roofing, window, window trim, floor, wall panel, door, door trim, decorative window furnishing or treatment; a treated glass cover for a picture, painting, poster, or display item; s protected graphic; an outdoor or indoor sign; an article made from a plastic-wood combination; a utility pit cover; cladding or seating for public transportation; cladding or seating for trains, subways, or buses; cladding for satellite dishes; coated helmet or personal protective equipment; coated synthetic or natural textiles; coated photographic film or photographic print; coated painted article; coated dyed article; coated fluorescent article; or coated foam article.

85. A film made from the composition of claim 1.
86. A film made from the composition of claim 4.
87. A film made from the composition of claim 9.
88. The method according to claim 31 wherein the acid acceptor is at least one member selected from the group consisting of amines, alkali metal hydroxides, alkaline earth hydroxides, and alkaline earth oxides.
89. The method according to claim 88 wherein the acid acceptor is sodium hydroxide.
90. The method according to claim 31 wherein the carbonate blocks comprise structural units derived from a 1,3-dihydroxybenzene moitey.
91. The method according to claim 31 wherein the carbonate blocks comprise structural units derived from at least two of unsubstituted resorcinol, a substituted resorcinol, and bisphenol A.
92. The method according to claim 31 wherein the carbonate blocks comprise structural units derived from dihydroxy substituted aromatic reactants of the formula:

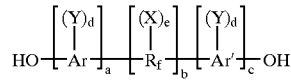

wherein $R_f$ is an alkylene, alkylidene, cycloalkylene, cycloalkylidene or arylene linkage or a mixture thereof; or a linkage selected from the group consisting of ether, carbonyl, amine, a sulfer or phosphorus containing linkage; Ar and Ar' are arene radicals; Y is a substituent selected from the group consisting of organic, inorganic and organometallic radicals; X is halogen or a monovalent hydrocarbon group selected from the group consisting of alkyl, aryl and cycloalkyl and combinations thereof; d represents a whole number of at least 0 up to a maximum equivalent to the number of replaceable hydrogens substituted on the aromatic rings comprising Ar or Ar'; e represents a whole number of from 0 to a maximum controlled by the number of replaceable hydrogens on $R_f$; a, b and c represent whole numbers including 0; when b is not zero, neither a or c may be zero, otherwise either a or c but not both may be 0; and when b is zero, the aromatic groups can be joined by direct carbon bonds.

93. The method according to claim 31 wherein the carbonate blocks comprise structural units derived from dihydroxy aromatic reactants of the formula:

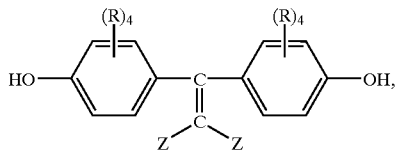

where independently each R is hydrogen, chlorine, bromine or a $C_{1-30}$ monovalent hydrocarbon or hydrocarbonxy group, each Z is hydrogen, chlorine or bromine, subject to the proviso that at least one Z is chlorine or bromine.

94. The method according to claim 31 wherein the carbonate block comprise structural units derived from dihydroxy aromatic reactants of the formula:

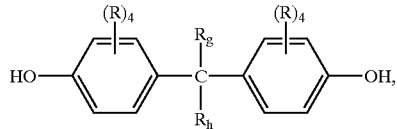

where independently each R is as defined hereinbefore, and independently $R_g$ and $R_h$ are hydrogen or a $C_{1-30}$ monovalent hydrocarbon group.

* * * * *